(12) United States Patent
Huang et al.

(10) Patent No.: US 6,934,117 B2
(45) Date of Patent: Aug. 23, 2005

(54) TECHNIQUE TO COMPENSATE FOR RESONANCES AND DISTURBANCES ON PRIMARY ACTUATOR THROUGH USE OF A SECONDARY ACTUATOR

(75) Inventors: Fu-Ying Huang, San Jose, CA (US); Matthew T. White, Mountain View, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 18 days.

(21) Appl. No.: 10/751,811

(22) Filed: Jan. 5, 2004

(65) Prior Publication Data

US 2005/0146807 A1 Jul. 7, 2005

(51) Int. Cl.[7] ............................................. G11B 5/596
(52) U.S. Cl. ................................................... 360/78.05
(58) Field of Search ...................................... 360/78.05

(56) References Cited

U.S. PATENT DOCUMENTS

| | | | |
|---|---|---|---|
| 6,064,540 A | 5/2000 | Huang et al. | |
| 6,339,512 B1 | 1/2002 | Sri-Jayantha et al. | |
| 6,487,028 B1 | 11/2002 | Sri-Jayantha et al. | |
| 6,583,964 B1 | 6/2003 | Huang et al. | |

OTHER PUBLICATIONS

Daniel Wu, Guoxiao Guo Midfrequency Disturbance Suppression via Micro-Actuator in Dual-Stage HDDs IEE vol. 38, No. 5.*

* cited by examiner

Primary Examiner—David Hudspeth
Assistant Examiner—Mitchell R Slavitt
(74) Attorney, Agent, or Firm—Joseph P. Curtin

(57) ABSTRACT

A control system for an actuator arm assembly of a hard disk drive reduces the Non-Repeatable Run-out (NRRO) caused from external sources exciting higher-frequency actuator arm assembly modes. The actuator arm assembly includes a primary actuator and a secondary actuator. The control system includes a primary control loop controlling the primary actuator and a secondary control loop controlling the secondary actuator. The secondary control loop includes at least one peak filter at a frequency corresponding to at least one frequency that is greater in frequency than the primary mode of the actuator arm assembly. The primary actuator can be any type of primary actuator. Similarly, the secondary actuator can be any type of actuator that is located between the primary actuator and a read/write head.

48 Claims, 26 Drawing Sheets

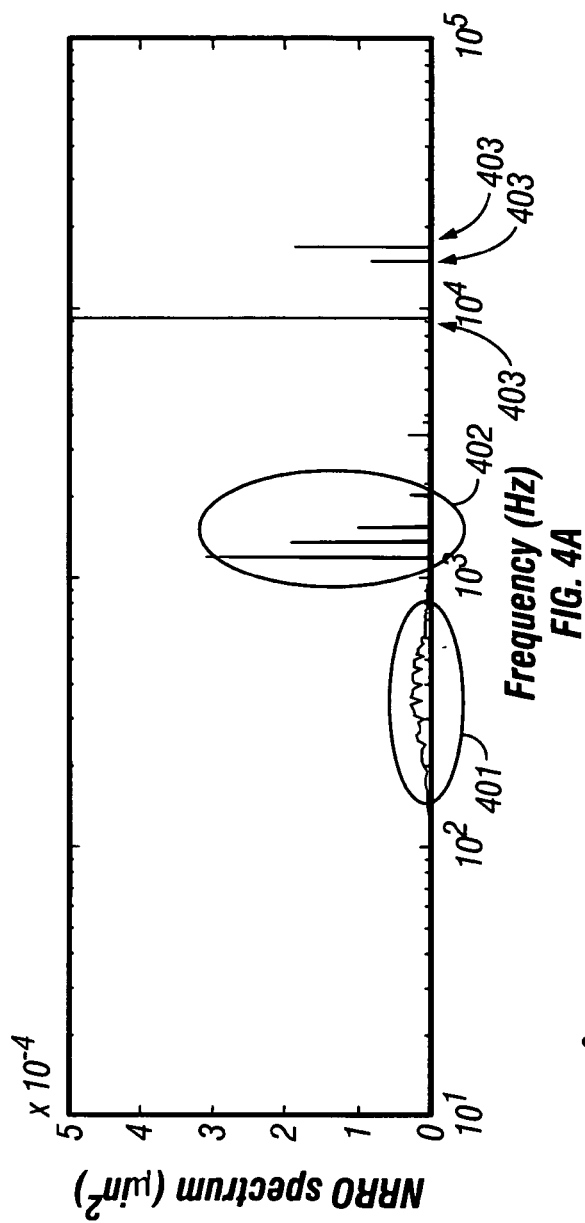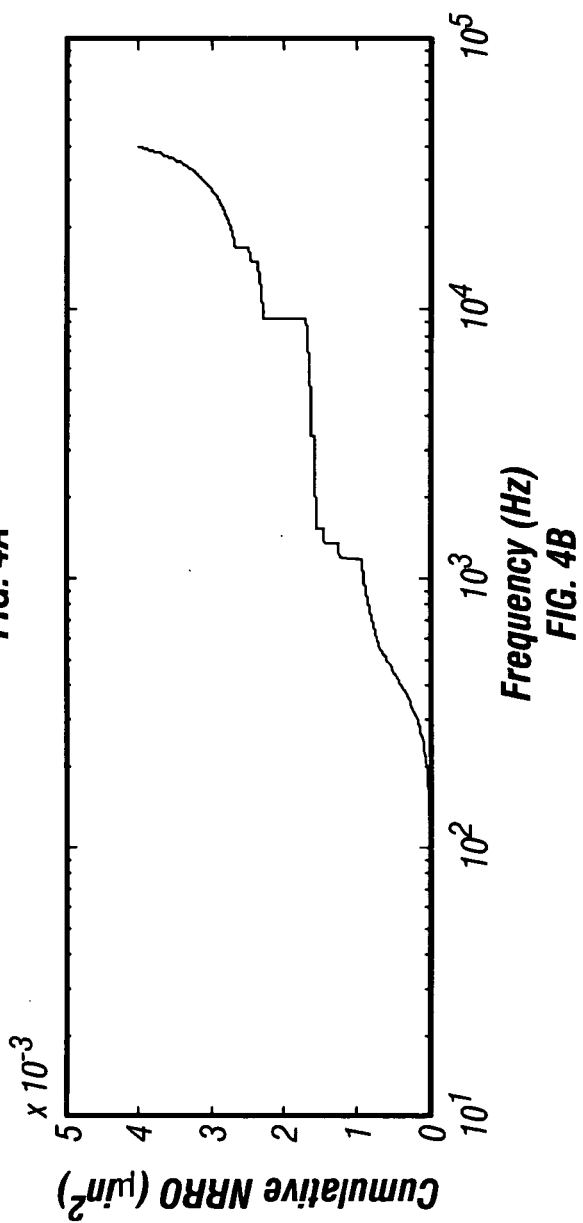
FIG. 4A
FIG. 4B

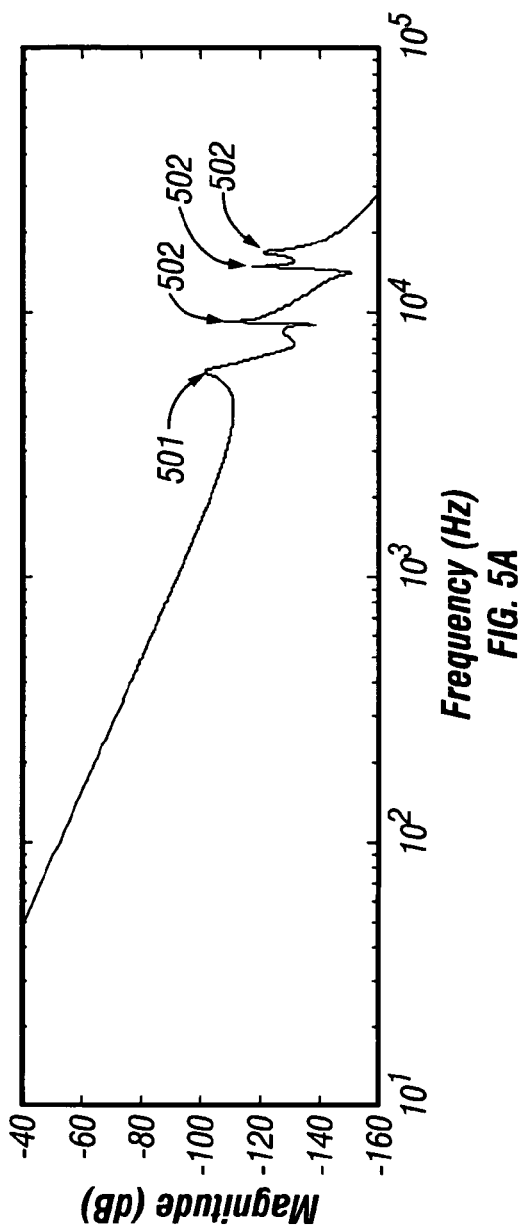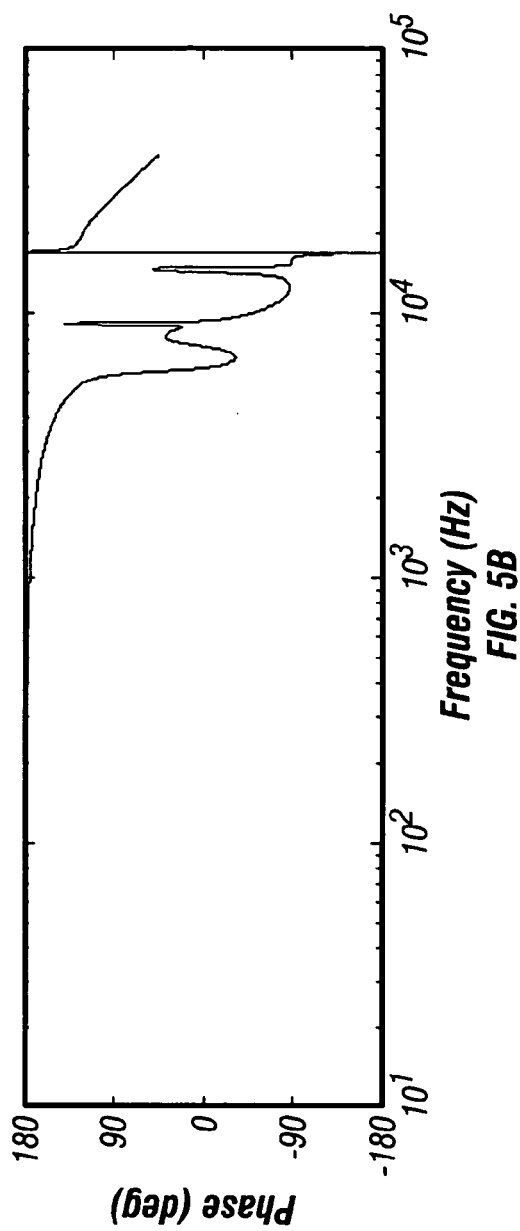

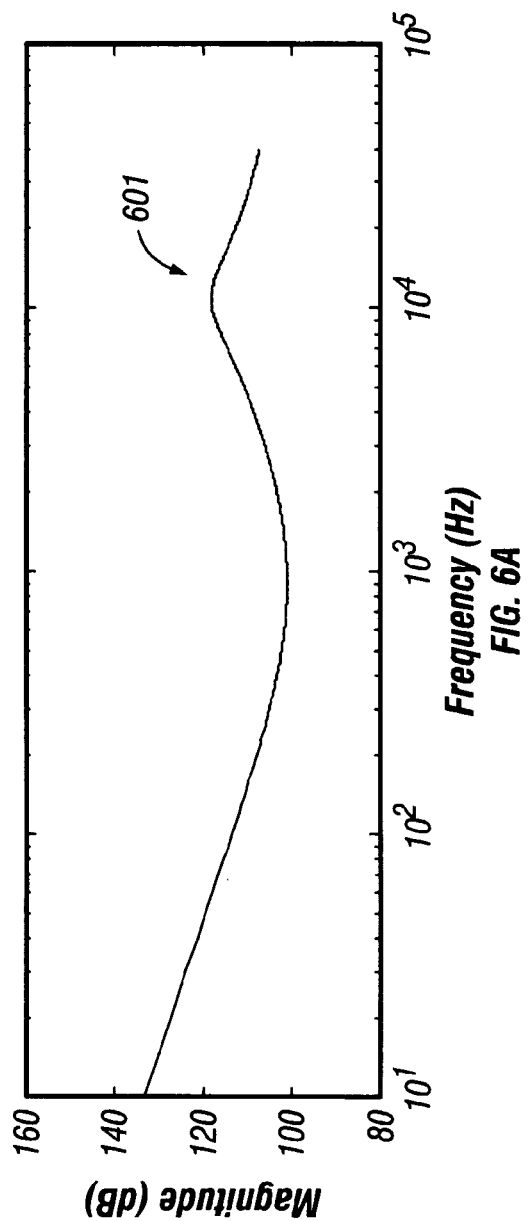
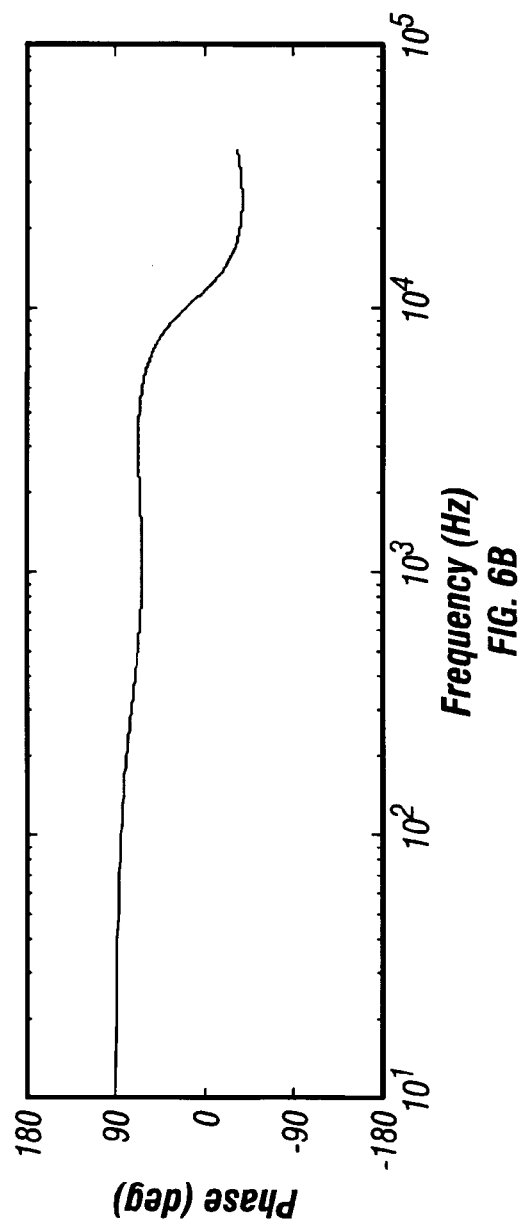
FIG. 6A
FIG. 6B

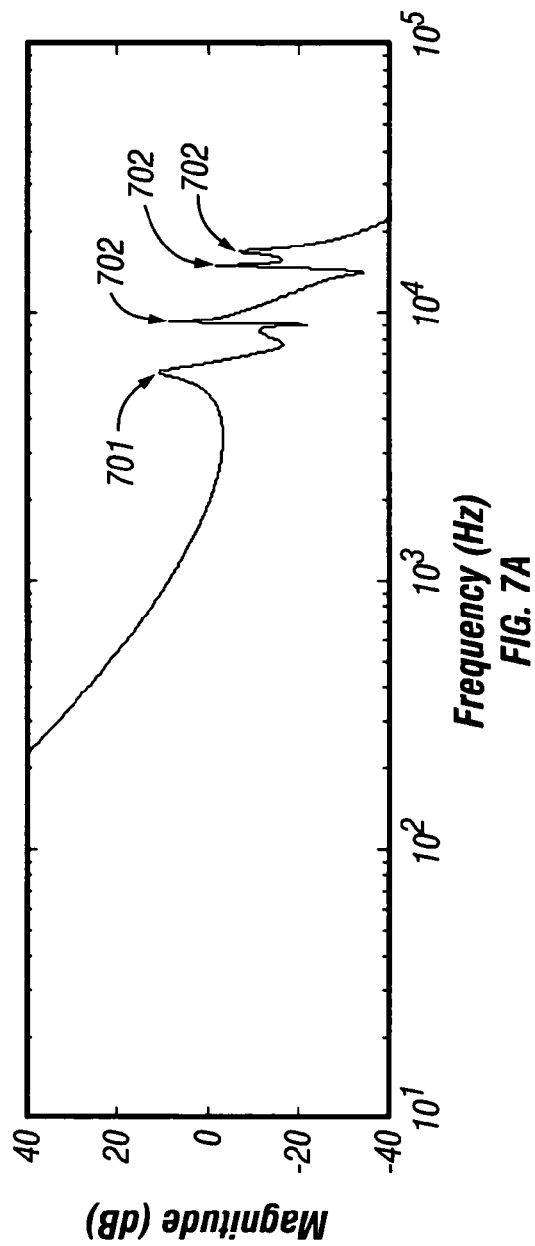
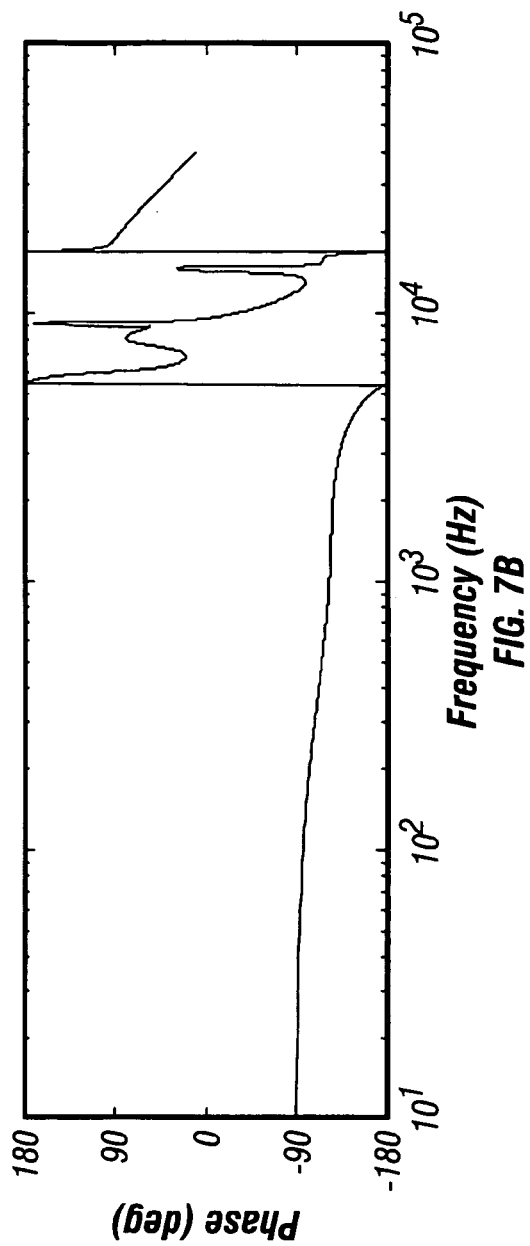
FIG. 7A
FIG. 7B

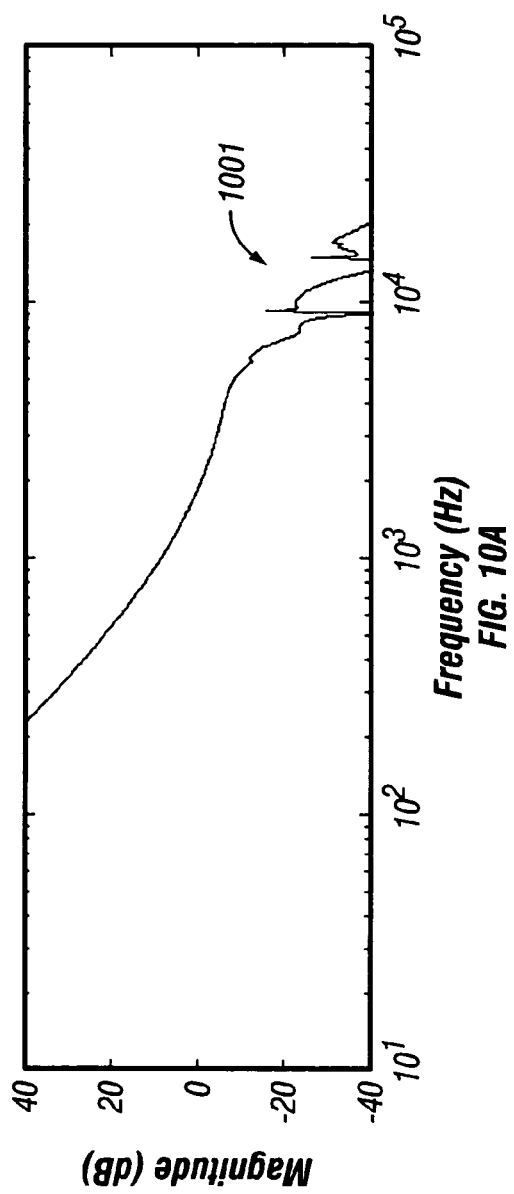
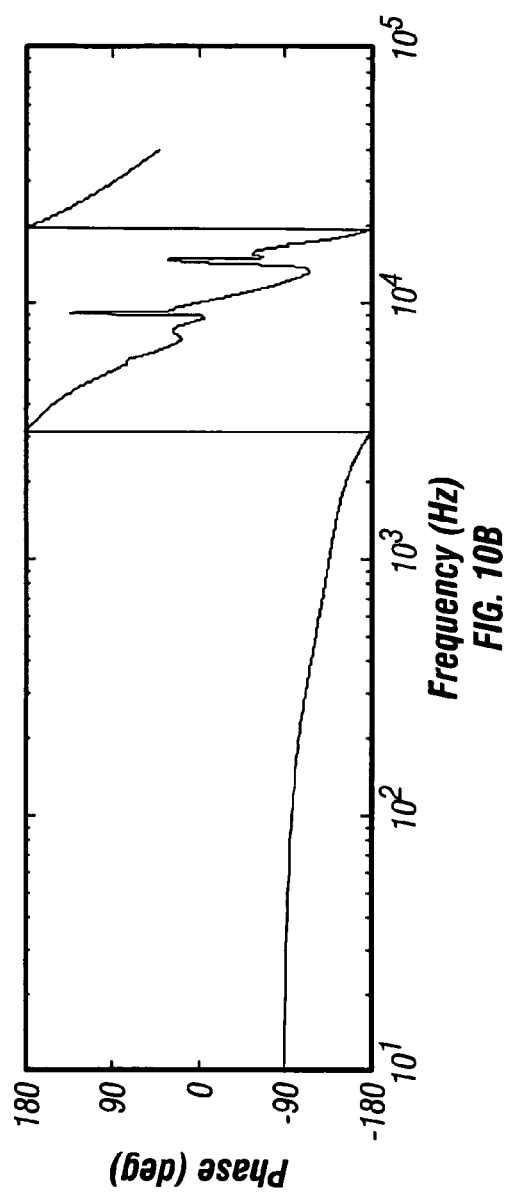

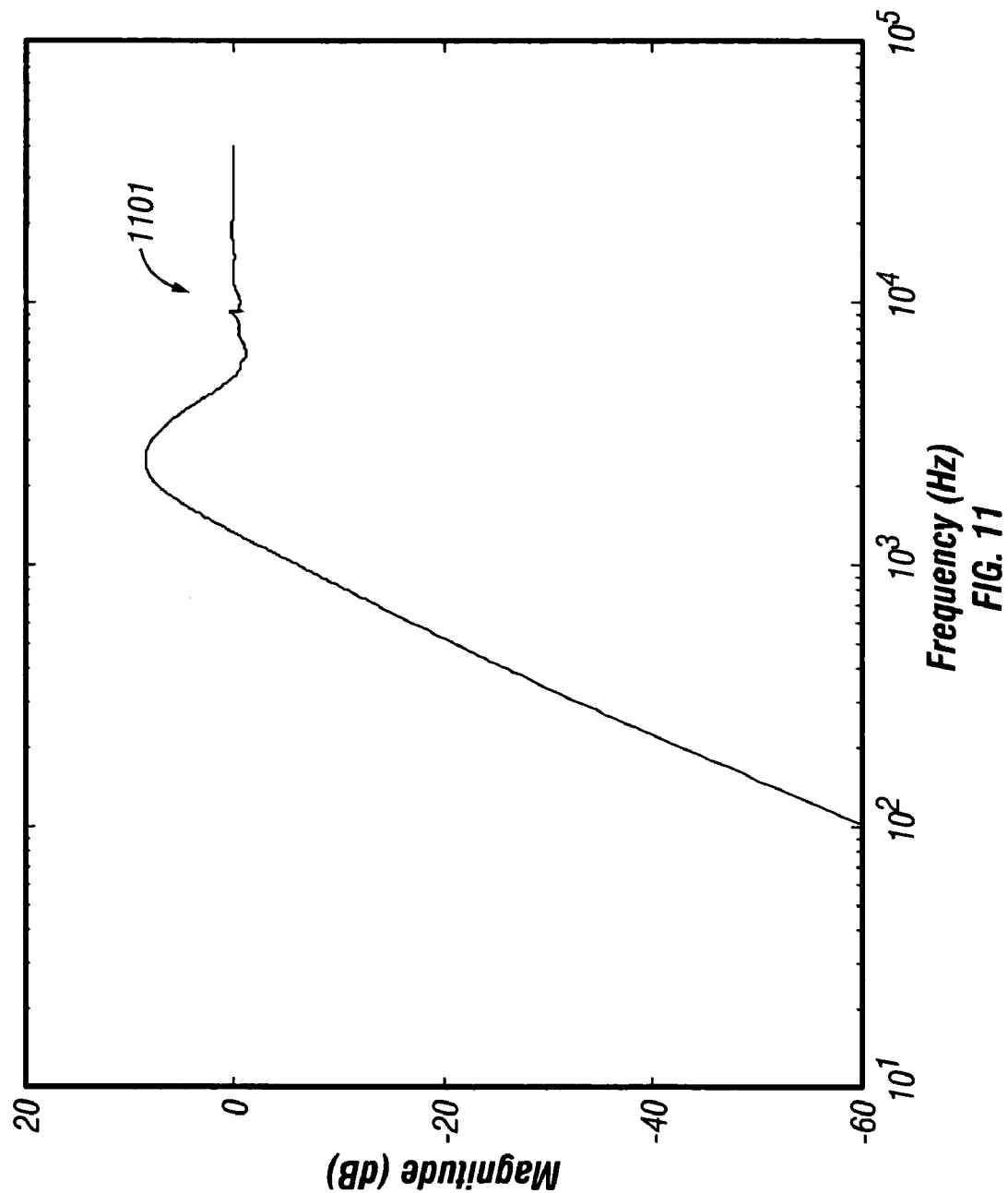

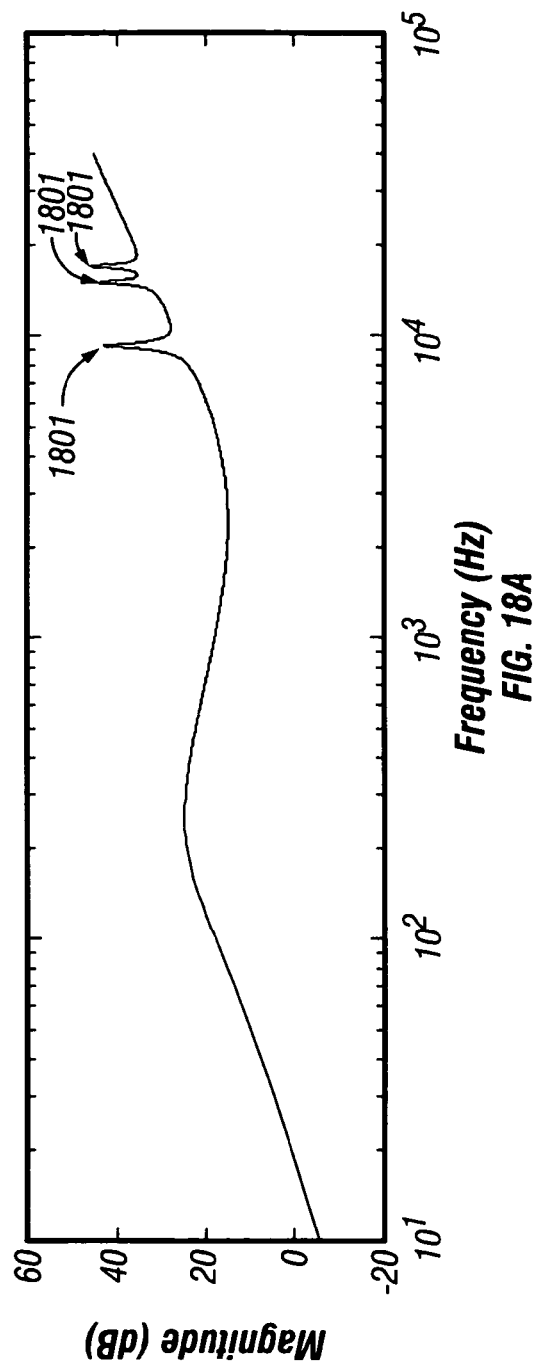
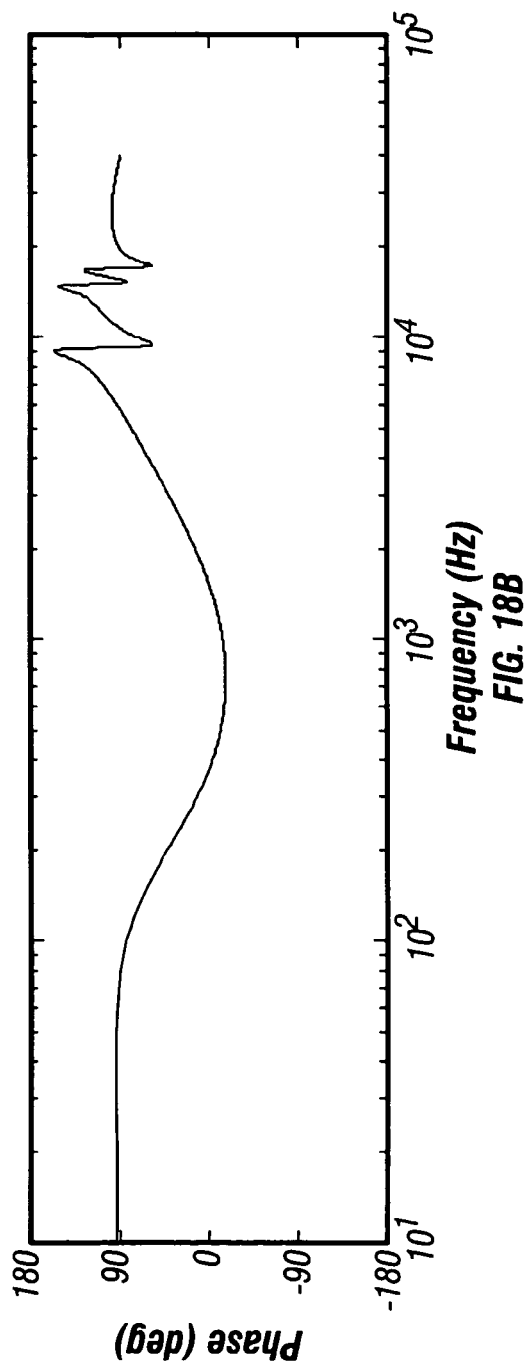
FIG. 18A
FIG. 18B

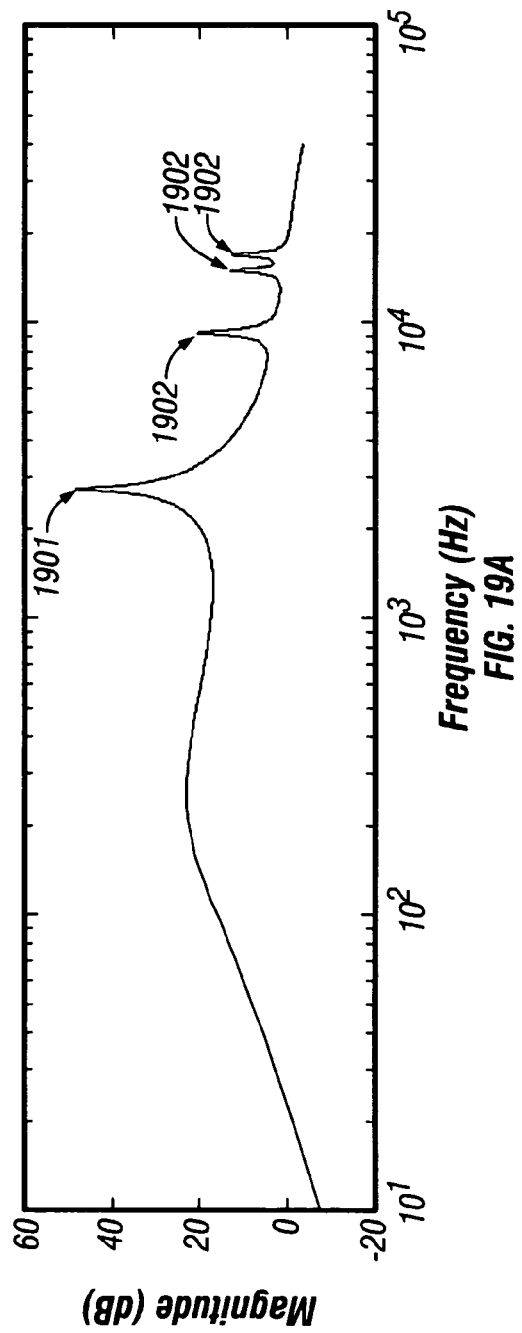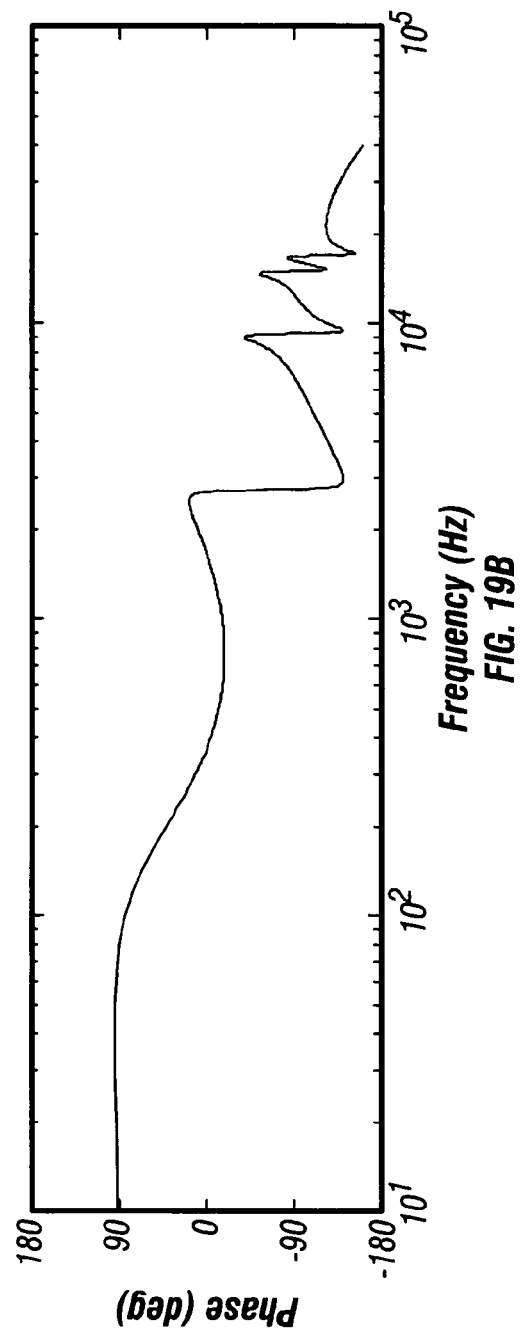

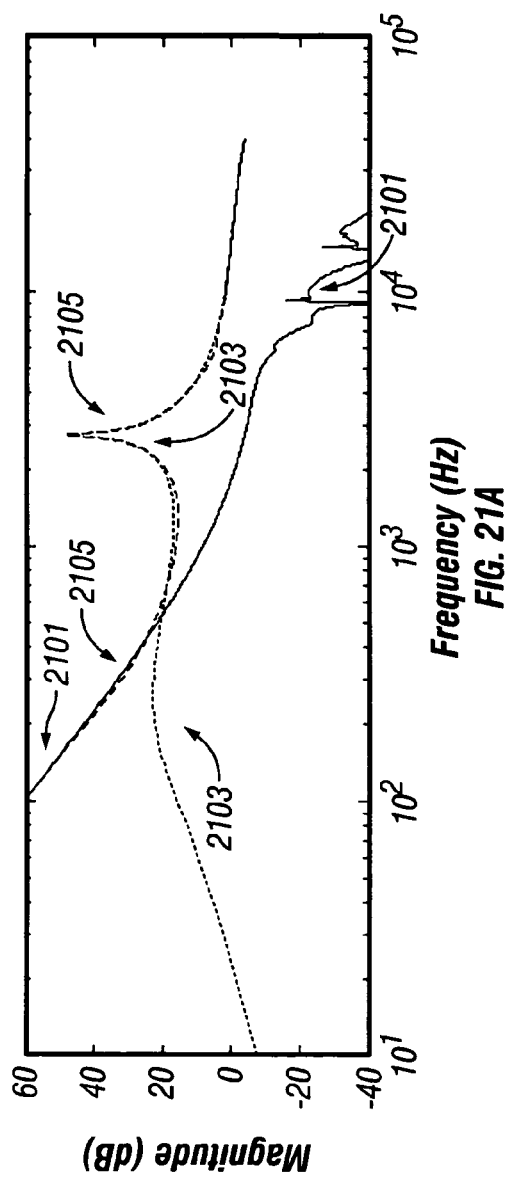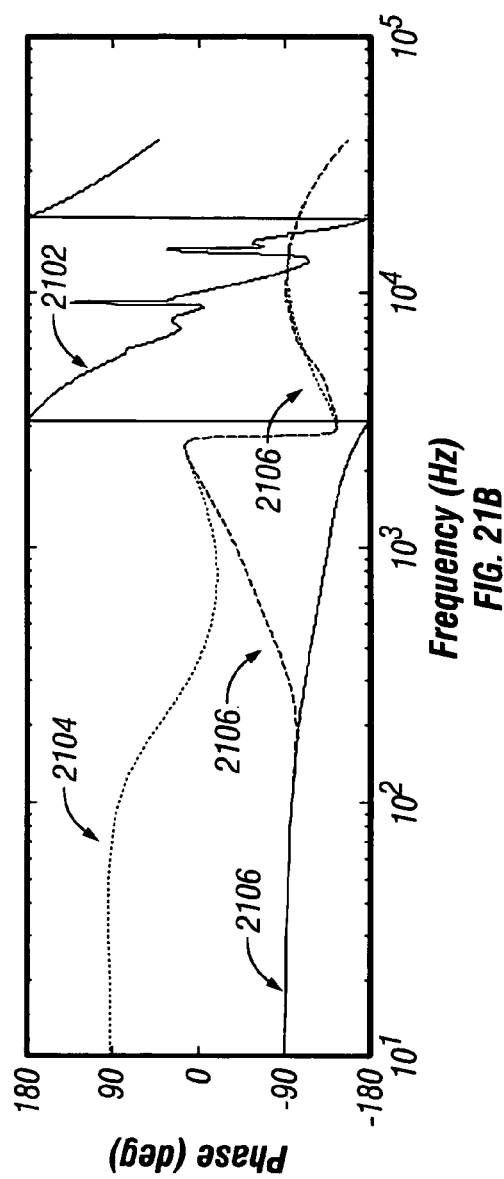
FIG. 21A
FIG. 21B

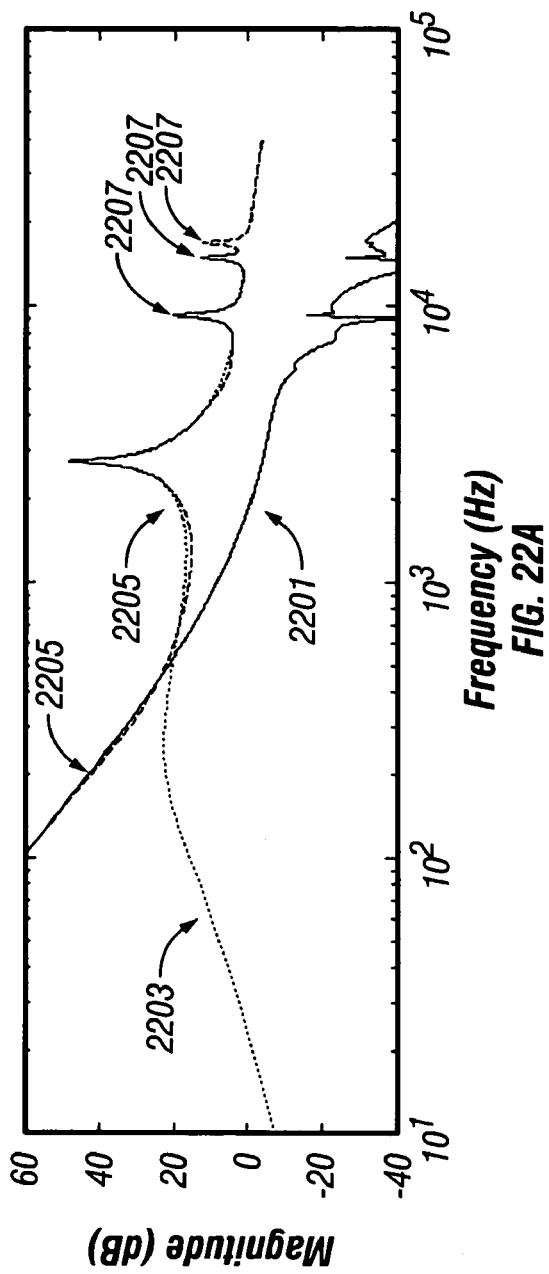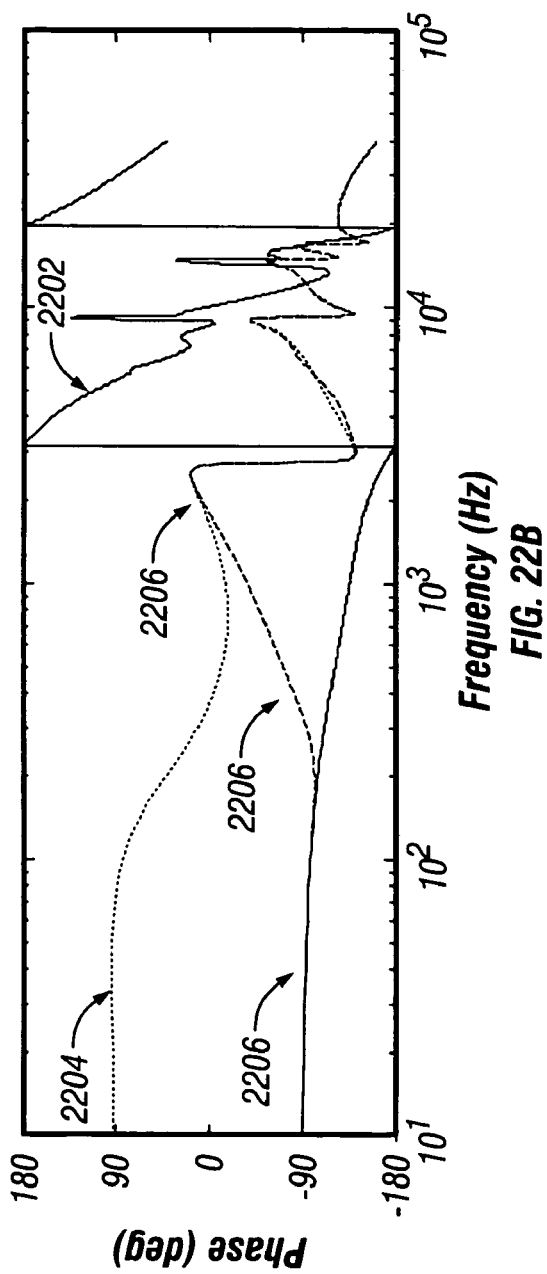
FIG. 22A
FIG. 22B

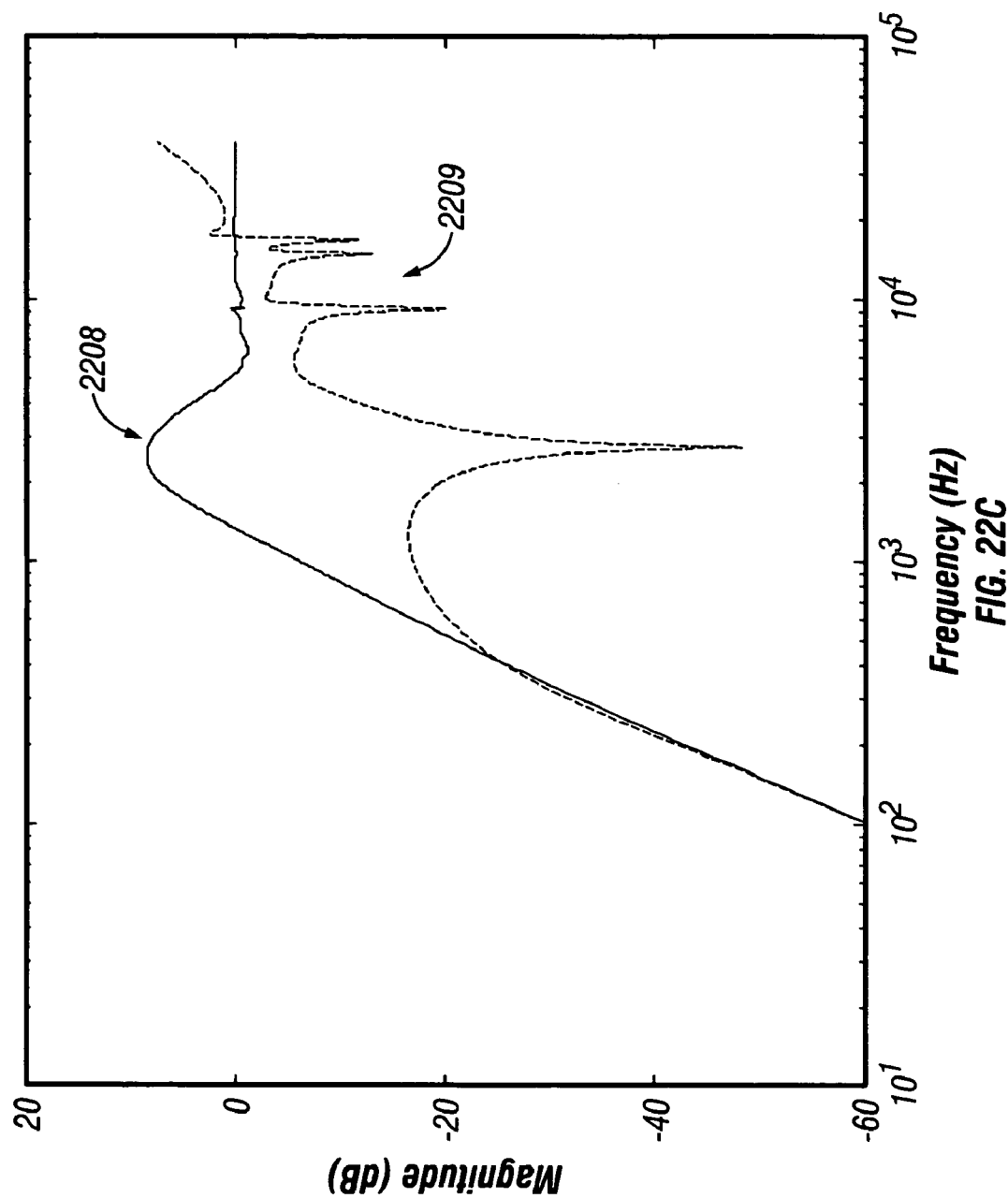

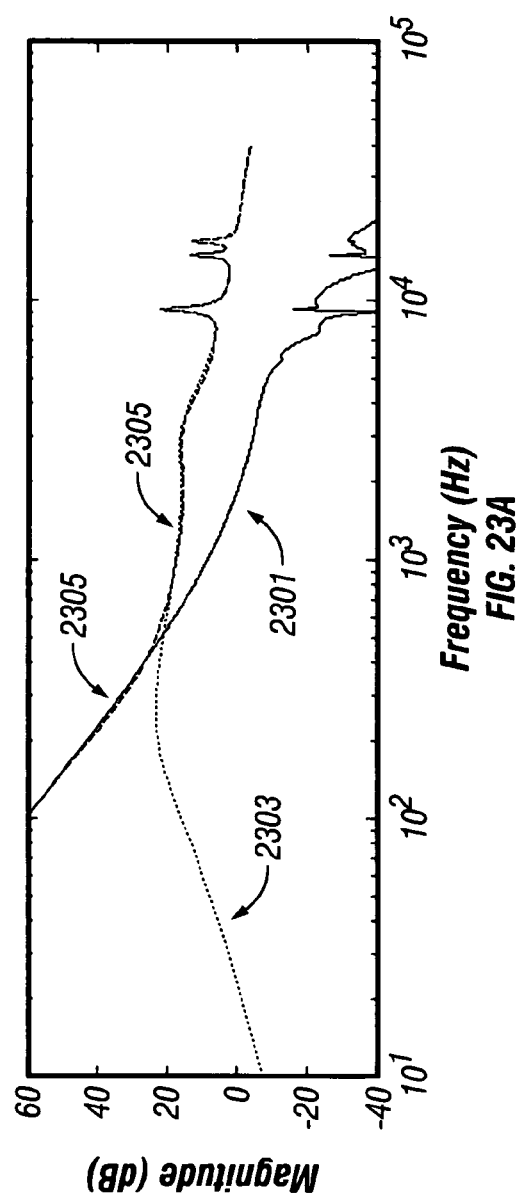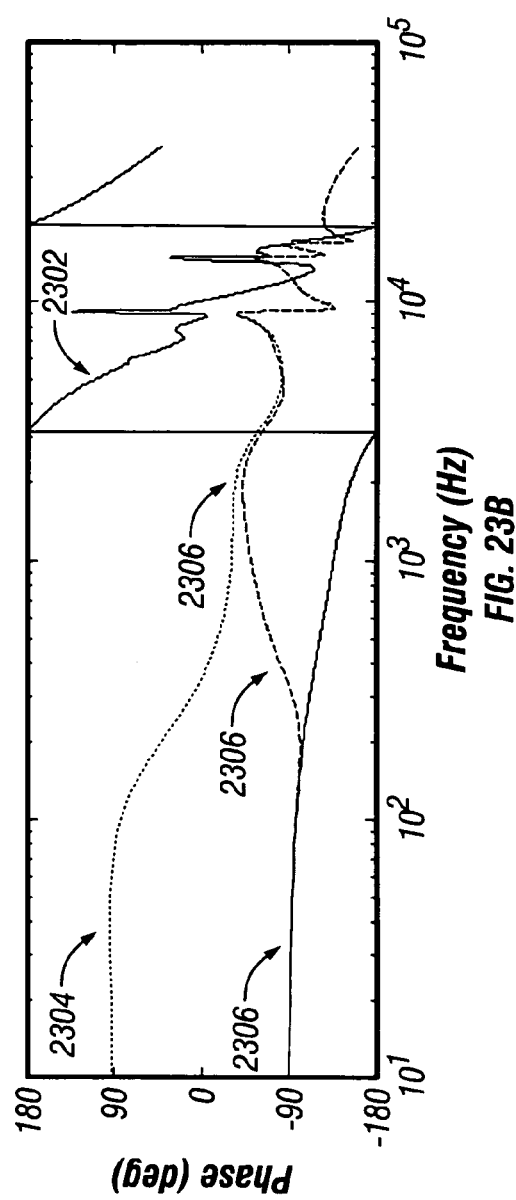
FIG. 23A
FIG. 23B

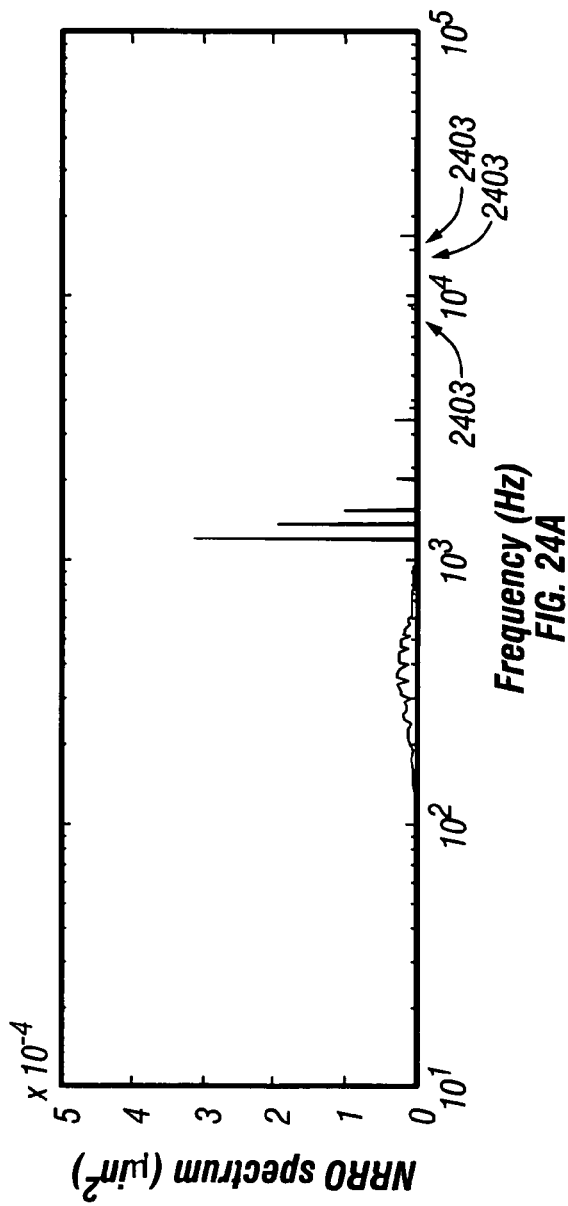
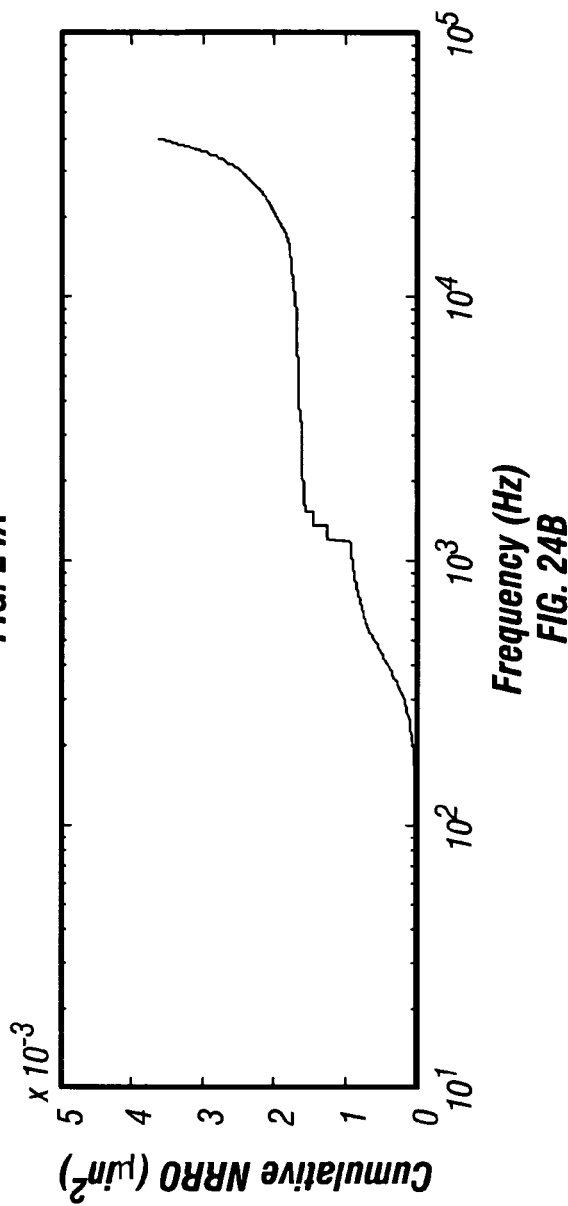

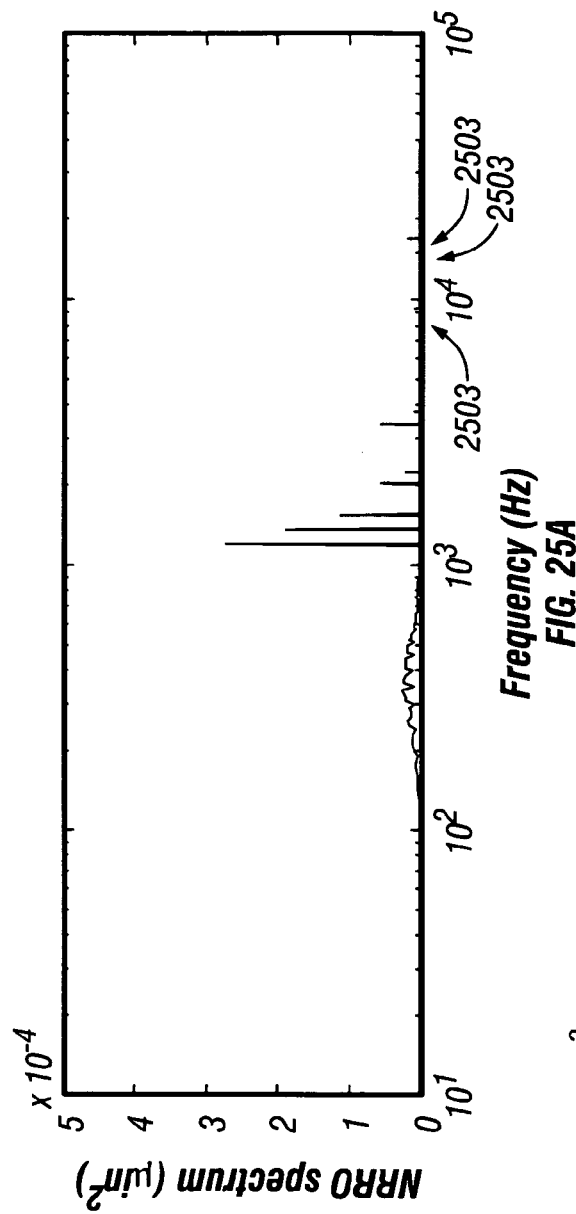
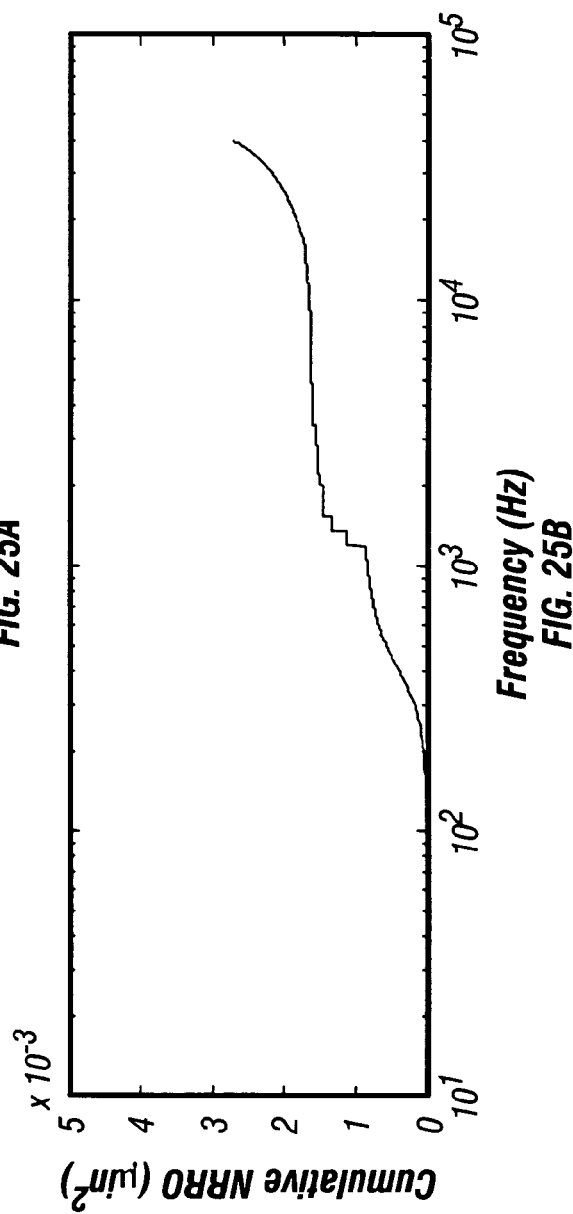
FIG. 25A
FIG. 25B

TECHNIQUE TO COMPENSATE FOR RESONANCES AND DISTURBANCES ON PRIMARY ACTUATOR THROUGH USE OF A SECONDARY ACTUATOR

BACKGROUND OF THE INVENTION

1. Field of the Invention

The present invention relates to hard disk drives (HDDs). More particularly, the present invention relates to a technique for reducing Non-Repeatable Run-Out (NRRO) of an actuator arm assembly of an HDD caused by high-frequency actuator and arm (actuator/arm) modes.

2. Description of the Related Art

FIG. 1 shows an exemplary hard disk drive (HDD) 100 having a dual-stage servo system for positioning a slider assembly 101 over a selected track on a magnetic disk 102 for writing data to and/or reading data from the surface of disk 102. The dual-stage servo system of HDD 100 includes a primary actuator 104, such as a rotary voice-coil motor (VCM), for coarse positioning an actuator arm 105 and a read/write head suspension 106, and a secondary actuator (not shown in FIG. 1), such as a microactuator or micropositioner, for fine positioning slider assembly 101 over a selected track. A microactuator (or a micropositioner), as used herein, is a small actuator that is typically placed between a suspension and a slider and moves the slider relative to the suspension, but can be placed on the suspension or other locations within a dual-stage servo system. Slider assembly 101 includes a read/write head (not shown) having a read element and a write element that respectively read data from and write data to disk 102. While HDD 100 is shown as having only a single magnetic disk 102, HDDs typically have a plurality of stacked, commonly rotated rigid magnetic disks and a corresponding number of actuator arms, read/write head suspensions, secondary actuators and slider assemblies.

FIG. 2 depicts a cross-section of an exemplary suspension and rotary microactuator arrangement 200 that can be part of a dual-stage servo system. Suspension and microactuator arrangement 200 includes a suspension 201, a microactuator 205 and a slider 209. Suspension 201 includes a load beam 202, a dimple 203 and a flexure 204. Microactuator 205 includes a substrate 206, a microactuator structure 207 and at least one flexure element 208. Substrate 206 is the stationary structure of microactuator 205. Microactuator structure 207 is the movable structure of microactuator 205. Slider 209 includes a read element 210 and a write element 211 that is offset from read element 210.

FIG. 3 is a schematic block diagram showing an exemplary actuator arm assembly 301 that can be used for the actuator arm assembly shown in FIG. 1. Actuator arm assembly 301 includes a primary actuator 302 (corresponding to VCM 104), an actuator arm portion 303 (corresponding to actuator arm 105), a read/write head suspension portion 304, (corresponding to suspension 106) and a slider assembly 305 (corresponding to slider assembly 101).

Actuator arm assembly 301 is controlled by an exemplary conventional control system 306 that includes a control circuit 307 that generates a signal 308 that is output to a primary amplifier 309 that, in turn, drives primary actuator 302. When primary actuator 302 is a rotary-type VCM, actuator arm assembly 301 rotates (as indicated by arrows 310), about a pivot 311 under the force generated by primary actuator 302. Control circuit 307 also generates a signal 312 that is output to a secondary amplifier 313 that, in turn, drives a secondary actuator (not shown in FIG. 3). A position signal 314 representing the position of slider assembly with respect to a disk is input to control circuit 307.

The position of a read/write head in relation to data on a disk is affected by the effects of VCM 302, external disturbances 315, resonant modes of actuator arm assembly 301, and motion of the disk. FIG. 4A is a graph of Non-Repeatable Run-Out (NRRO) as a function of frequency based on representative data that is typical for the currently available generation of actuator arm assemblies. FIG. 4B is a graph of cumulative NRRO as a function of frequency corresponding to the graph of FIG. 4A. The abscissa for both FIGS. 4A and 4B is the frequency, and the ordinate of both FIGS. 4A and 4B is NRRO. It should be understood that all of the graphs depicted herein are simulations that are based on data that is representative for the currently available generation of actuator arm assemblies for the enterprise class of hard disk drives. It should also be understood that graphs depicted herein could be based on data that is representative for other currently available classes of hard disk drives, such as desktop hard disk drives, mobile hard disk drives and consumer electronics hard disk drives. In FIG. 4A, NRRO caused by operational vibration (an external disturbance 315) is indicated at 401. NRRO caused by disk flutter (another external disturbance 315) is indicated at 402. NRRO caused by high-frequency actuator and arm (actuator/arm) mode effects of actuator arm assembly 301 is indicated at 403. The large amplitude motion at the high-frequency resonances of actuator arm assembly 301 may result in the inability of the read/write head to read or write data at the appropriate location on a disk.

Many of the resonant modes of actuator arm assembly 301 are greater than the bandwidth of the control loop for VCM 302 because the control bandwidth of VCM 302 is generally limited to be below the first main resonance of VCM 302. For example, FIGS. 5A and 5B respectively show a magnitude and phase response as a function of frequency for primary amplifier 309 and VCM 302. The first main resonance, or primary mode, of VCM 302, commonly referred to as the butterfly mode, is indicated at 501 in FIG. 5A. Higher-frequency actuator and arm (actuator/arm) modes corresponding to high-frequency actuator/arm mode effects 403 in FIG. 4A are indicated at 502 in FIG. 5A.

FIGS. 6A and 6B respectively show a magnitude and phase response as a function of frequency for the primary control portion of conventional control circuit 307, that is, the portion of control circuit 307 that controls VCM 302. FIGS. 7A and 7B respectively show an open-loop magnitude and phase response as a function of frequency for the primary control portion of control circuit 307, primary amplifier 309 and VCM 302. The butterfly mode can be observed at 701 and the higher-frequency actuator/arm modes can be observed at 702. FIG. 8 shows a closed-loop magnitude response of the VCM error rejection as a function of frequency for the primary control portion of control circuit 307, primary amplifier 309 and VCM 302. At higher frequencies corresponding to the frequencies of the actuator/arm modes, portions of the VCM open-loop frequency response corresponding to the higher-frequency actuator/arm modes are greater than 0 dB, as indicated by 702 in FIG. 7A. This generally results in portions of the VCM error rejection corresponding to the higher-frequency actuator/arm modes that are less than 0 dB, as indicated by 801 in FIG. 8. Magnitudes of the error rejection frequency response that are less than 0 dB indicate desirable disturbance rejection. Higher-frequency actuator/arm modes that have VCM open-loop frequency response magnitudes that are greater than 0 dB, however, are difficult or impossible to stabilize and often lack robustness to manufacturing tolerances, parameter variations, and other factors. Thus, a conventional primary control loop for a VCM does not adequately compensate for higher-frequency actuator/arm modes.

One conventional approach to reduce the NRRO that occurs at the higher-frequency actuator/arm modes has been to use notch filters in the primary control loop to prevent primary actuator 302 from exciting the resonant modes of actuator arm assembly 301. FIGS. 9A and 9B respectively show a magnitude and phase response as a function of frequency for the primary control portion of control circuit 307 when control circuit 307 includes notch filters. The effect on the frequency response by the notch filters are shown at 901. FIGS. 10A and 10B respectively show an open-loop magnitude and phase response as a function of frequency for the primary control portion of control circuit 307, primary amplifier 309 and VCM 302 when control circuit 307 includes notch filters. The attenuating effect of the notch filters on the higher-frequency actuator/arm modes is shown at 1001. FIG. 11 shows a closed-loop magnitude and phase of the VCM error rejection as a function of frequency for the primary control loop portion of control circuit 307, primary amplifier 309 and VCM 302 when control circuit 307 includes notch filters. The magnitudes of the VCM open-loop frequency response at the higher-frequency actuator/arm modes are well below 0 dB, as indicated by 1001 in FIG. 10, so there are no stability issues associated with the higher-frequency actuator/arm modes and the higher-frequency actuator/arm modes should be excited only weakly by the motion of the actuator arm assembly 1201. The magnitudes of the VCM error rejection frequency response at the higher-frequency actuator/arm modes, however, is nearly flat at 0 dB, as indicated by 1101 in FIG. 11. This means that the higher-frequency actuator/arm modes are very susceptible to excitation by other types of disturbances, such as airflow.

Thus, the decreased open-loop gain caused by the notch filters decreases the disturbance rejection of control loop for primary actuator 302 at the frequencies of the higher-frequency actuator/arm modes, thereby making the resonant modes more susceptible to excitation caused by external disturbances 315. One technique to increase the disturbance rejection at a particular frequency is to introduce a peak filter. See, for example, U.S. Pat. Nos. 6,339,512 and 6,487,028, both to Sri-Jayantha et al. Introducing peak filters in to the primary control loop at the higher-frequency actuator/arm modes, however, would cancel the stabilizing effects of the notch filters and suffer the same instability and robustness issues as the case without the notch filters shown in FIGS. 7A and 7B.

Another technique to improve disturbance rejection is to increase the open loop bandwidth. Increasing the open loop bandwidth of the primary control loop also has limited effectiveness in reducing the adverse effects of the higher-frequency actuator/arm modes. The Bode Integral Theorem mathematically proves that all feedback loops have a region of disturbance attenuation and a region of disturbance amplification. See, for example, H. W. Bode, Network Analysis and Feedback Amplifier Design, Princeton, N.J.: Van Nostrand, 1945. Moreover, the ratio of the attenuation to the amplification regions is fixed. Consequently, regardless of how a higher bandwidth is achieved for the primary control loop, the disturbance amplification region will still exist and will generally be pushed to a higher frequency. Because the bandwidth of the primary control loop is generally limited to be below the butterfly mode, the negative affects of the higher frequency actuator/arm modes will potentially be exacerbated.

Yet another approach for reducing NRRO is based on design of shrouding and mechanics for reducing actuator/arm mode excitation caused by airflow, but often provides limited effectiveness and may have negative implications on other aspects of the HDD.

Consequently, what is needed is a technique for reducing the adverse effects of high-frequency actuator/arm modes, while maintaining stability and robustness, thereby reducing total off-track motion of a read/write head and enabling a higher track density for an HDD.

BRIEF SUMMARY OF THE INVENTION

The present invention provides a technique for significantly reducing the adverse effects of high-frequency actuator/arm modes, while maintaining stability and robustness, thereby reducing total off-track motion of a read/write head and enabling a higher track density for an HDD.

The advantages of the present invention are provided by a control system for an actuator arm assembly for a hard disk drive. The actuator arm assembly includes a primary actuator. The primary actuator can be any type of primary actuator, such as a rotary-type primary actuator or a linear-type primary actuator. The actuator arm assembly also includes a secondary actuator. The secondary actuator can be any type of secondary actuator, such as an undamped rotary-type micro-electro-mechanical-system (MEMS) microactuator, a damped rotary-type MEMS microactuator, an undamped linear-type MEMS microactuator, a damped linear-type MEMS microactuator, or a PZT-based secondary actuator. A primary control loop controls the primary actuator, and a secondary control loop controls the secondary actuator. According to the present invention, the secondary control loop includes at least one peak filter at a frequency that is greater in frequency than a primary mode of the actuator arm assembly. For example, at least one peak filter can have a frequency corresponding to a mode of the actuator arm assembly. Alternatively, at least one peak filter can have a frequency corresponding to a frequency of a disturbance that is external to the actuator arm assembly and that affects a position of the actuator arm assembly, such as an airflow disturbance. Further, at least one peak filter can have a frequency corresponding to off-track motion induced by the primary actuator, a frequency corresponding to a frequency of a disturbance that causes non-repeatable runout, and/or a frequency corresponding to a frequency of a disturbance that causes repeatable runout. The secondary control loop includes a controller portion and a feedback portion in which at least one peak filter is included in the controller portion of the secondary control loop. Alternatively, at least one peak filter is included in the feedback portion of the secondary control loop.

The present invention also provides a hard disk drive having an actuator arm that includes a primary actuator and a secondary actuator, and a control system having a primary control loop controlling the primary actuator and a secondary control loop controlling the secondary actuator. The actuator arm assembly includes a primary actuator. The primary actuator can be any type of primary actuator, such as a rotary-type primary actuator or a linear-type primary actuator. The actuator arm assembly also includes a secondary actuator. The secondary actuator can be any type of secondary actuator, such as an undamped rotary-type micro-electro-mechanical-system (MEMS) microactuator, a damped rotary-type MEMS microactuator, an undamped linear-type MEMS microactuator, a damped linear-type MEMS microactuator, or a PZT-based secondary actuator. A primary control loop controls the primary actuator, and a secondary control loop controls the secondary actuator. According to the present invention, the secondary control loop includes at least one peak filter at a frequency that is greater in frequency than a primary mode of the actuator arm assembly. For example, at least one peak filter can have a frequency corresponding to a mode of the actuator arm assembly. Alternatively, at least one peak filter can have a frequency corresponding to a frequency of a disturbance that is external to the actuator arm assembly and that affects a position of the actuator arm assembly, such as an airflow disturbance. Further, at least one peak filter can have a frequency corresponding to off-track motion induced by the primary actuator, a frequency corresponding to a frequency of a disturbance that causes non-repeatable runout, and/or a frequency corresponding to a frequency of a disturbance that causes repeatable runout. The secondary control loop includes a controller portion and a feedback portion in which at least one peak filter is included in the controller portion of the secondary control loop. Alternatively, at least one peak filter is included in the feedback portion of the secondary control loop.

BRIEF DESCRIPTION OF THE DRAWINGS

The present invention is illustrated by way of example and not by limitation in the accompanying figures in which like reference numerals indicate similar elements and in which:

FIG. 4A is a graph of Non-Repeatable Run-Out (NRRO) as a function of frequency for an exemplary actuator arm assembly, such as the actuator arm assembly shown in FIG. 3;

FIG. 4B is a graph of cumulative NRRO as a function of frequency corresponding to the graph of FIG. 4A.

FIGS. 5A and 5B respectively show a magnitude and phase response as a function of frequency for the primary amplifier and the VCM shown in FIG. 3;

FIGS. 6A and 6B respectively show a magnitude and phase response as a function of frequency for the primary control loop portion of the control circuit shown in FIG. 3;

FIGS. 7A and 7B respectively show an open-loop magnitude and phase response as a function of frequency for the primary control loop portion of the control circuit, the primary amplifier and the VCM shown in FIG. 3;

FIGS. 10A and 10B respectively show an open-loop magnitude and phase response as a function of frequency for the primary control loop portion of the control circuit, the primary amplifier and the VCM shown in FIG. 3 when the control circuit includes notch filters;

FIG. 11 shows a closed-loop magnitude of the VCM error rejection as a function of frequency for the primary control loop portion of the control circuit, the primary amplifier and the VCM shown in FIG. 3 when the control circuit includes notch filters;

FIGS. 18A and 18B respectively show a magnitude and phase response as a function of frequency of a secondary controller having peak filters according to the present invention;

FIGS. 19A and 19B respectively show an open-loop magnitude and phase response as a function of frequency of a secondary microactuator controller having peak filters according to the present invention, a secondary amplifier and an undamped rotary MEMS microactuator;

FIGS. 21A and 21B respectively show open-loop magnitude and phase responses as functions of frequency for a VCM and for a secondary controller having no peak filters, a secondary amplifier and an undamped rotary MEMS microactuator;

FIGS. 22A and 22B respectively show open-loop magnitude and phase responses as functions of frequency for a VCM and for a secondary controller having peak filters according to the present invention, a secondary amplifier and an undamped rotary MEMS microactuator;

FIG. 22C shows magnitudes of the error rejection frequency responses for a primary control loop that includes a VCM and for a secondary controller having peak filters according to the present invention, a secondary amplifier and a damped rotary MEMS microactuator;

FIGS. 23A and 23B respectively show open-loop magnitude and phase responses as a function of frequency for a VCM and for a secondary controller having peak filters according to the present invention, a secondary amplifier and a damped rotary MEMS microactuator;

FIG. 24A is a graph of NRRO as a function of frequency for an exemplary actuator arm assembly in which a secondary controller includes peak filters according to the present invention and an undamped rotary MEMS microactuator;

FIG. 24B is a graph of cumulative NRRO as a function of frequency corresponding to the graph of FIG. 24A.

FIG. 25A is a graph of NRRO as a function of frequency for an exemplary actuator arm assembly in which a secondary controller includes peak filters according to the present invention and a damped rotary MEMS microactuator; and FIG. 25B is a graph of cumulative NRRO as a function of frequency corresponding to the graph of FIG. 25A.

DETAILED DESCRIPTION OF THE INVENTION

The present invention provides a technique for significantly reducing the adverse effects of high-frequency actuator/arm modes by adding localized regions of high open-loop gain, or peak filters, to the control loop for a secondary actuator that are at frequencies that are near the frequencies of the high-frequency actuator/arm modes. Consequently, total off-track motion of a read/write head is reduced and higher track density for an HDD is enabled.

Figure 1:
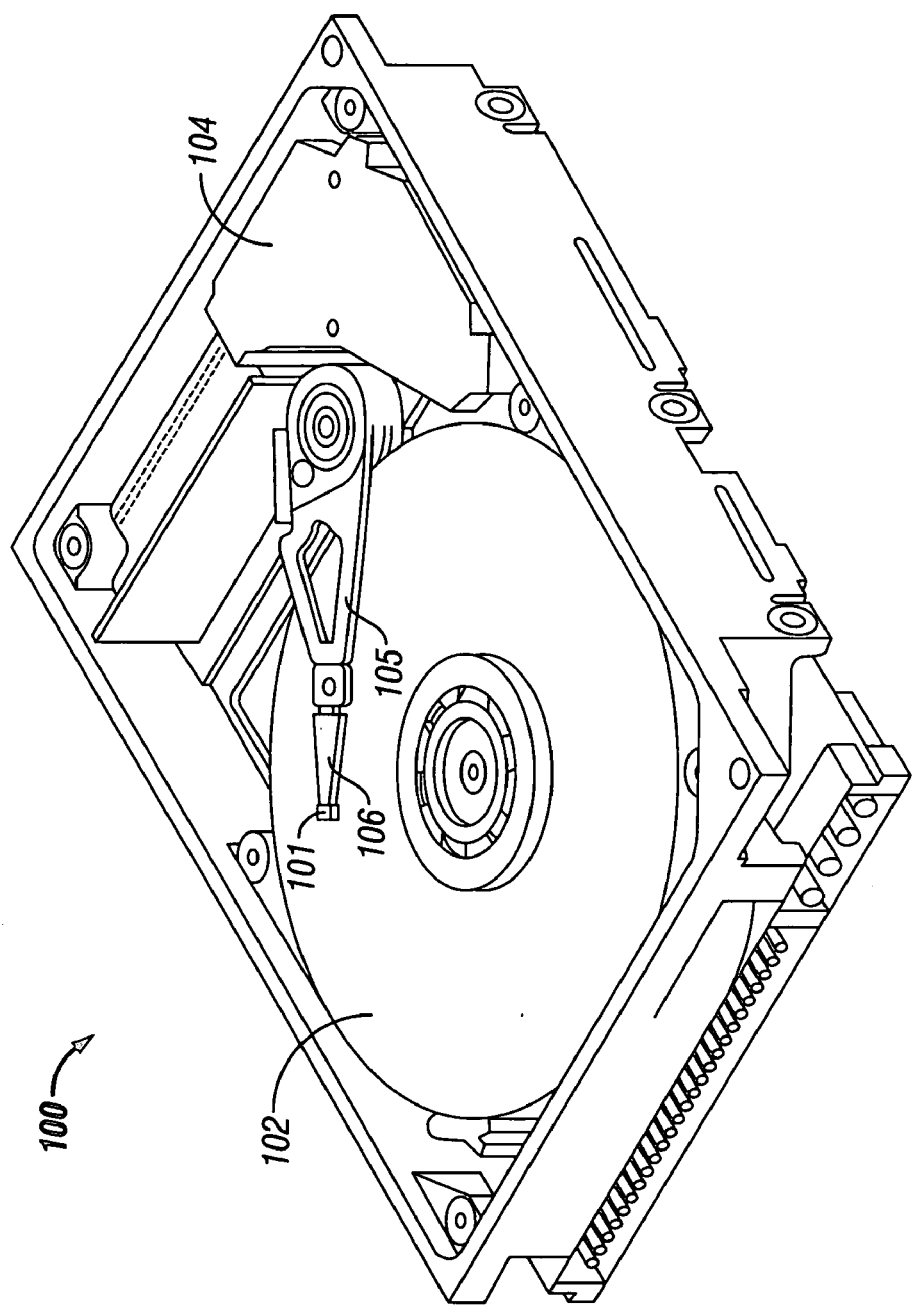
FIG. 1 shows an exemplary hard disk drive (HDD) having a dual-stage servo system.
Figure 2:
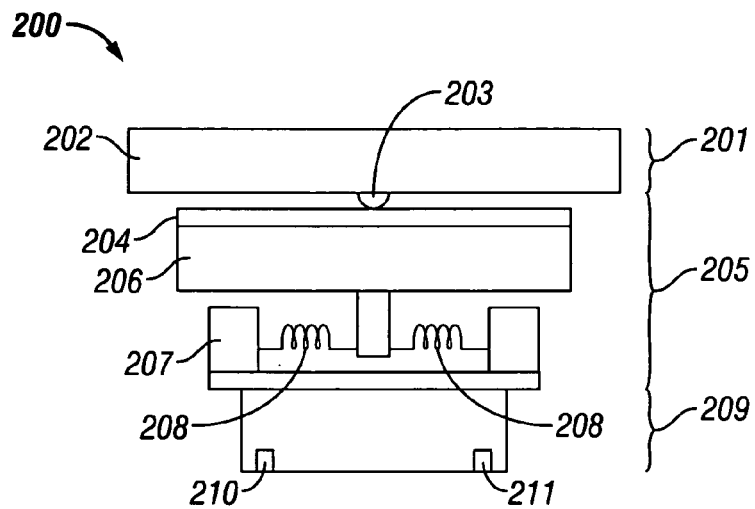
FIG. 2 depicts a cross-sectional view of an exemplary suspension and rotary microactuator arrangement for a dual-stage servo system.
Figure 3:
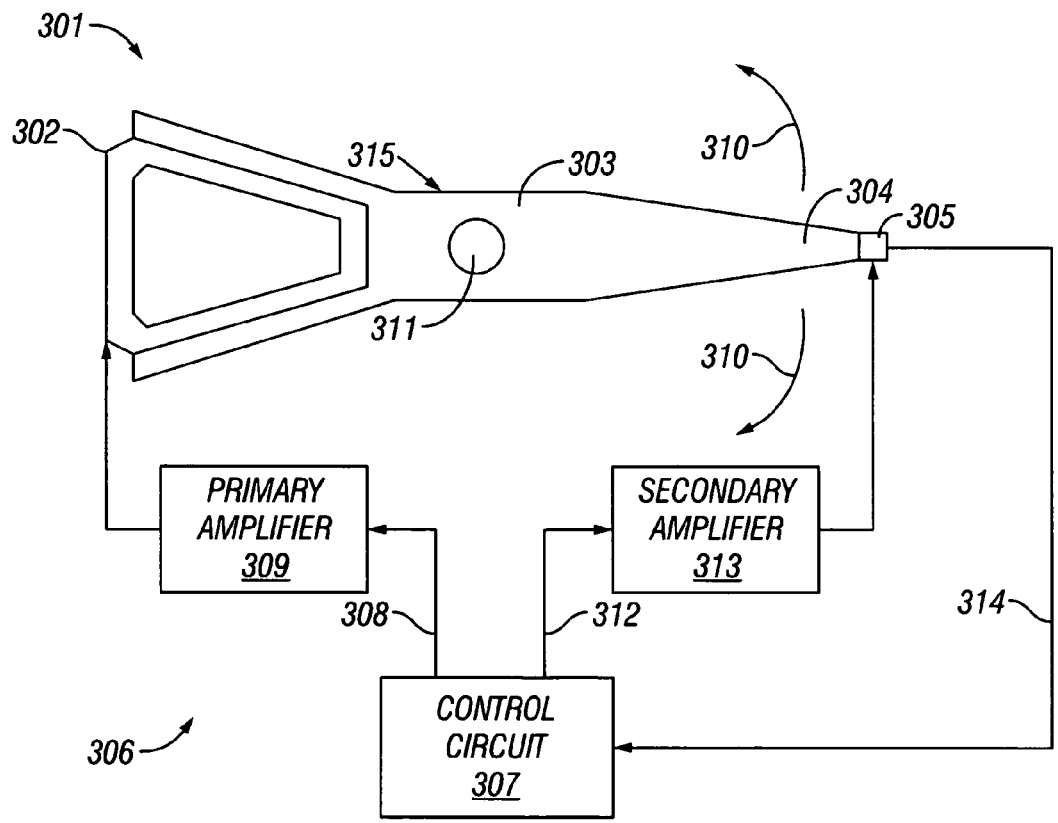
FIG. 3 is a schematic block diagram showing an exemplary actuator arm assembly and an exemplary primary control system that can be used for the actuator arm assembly shown in FIG. 1.
Figure 8:
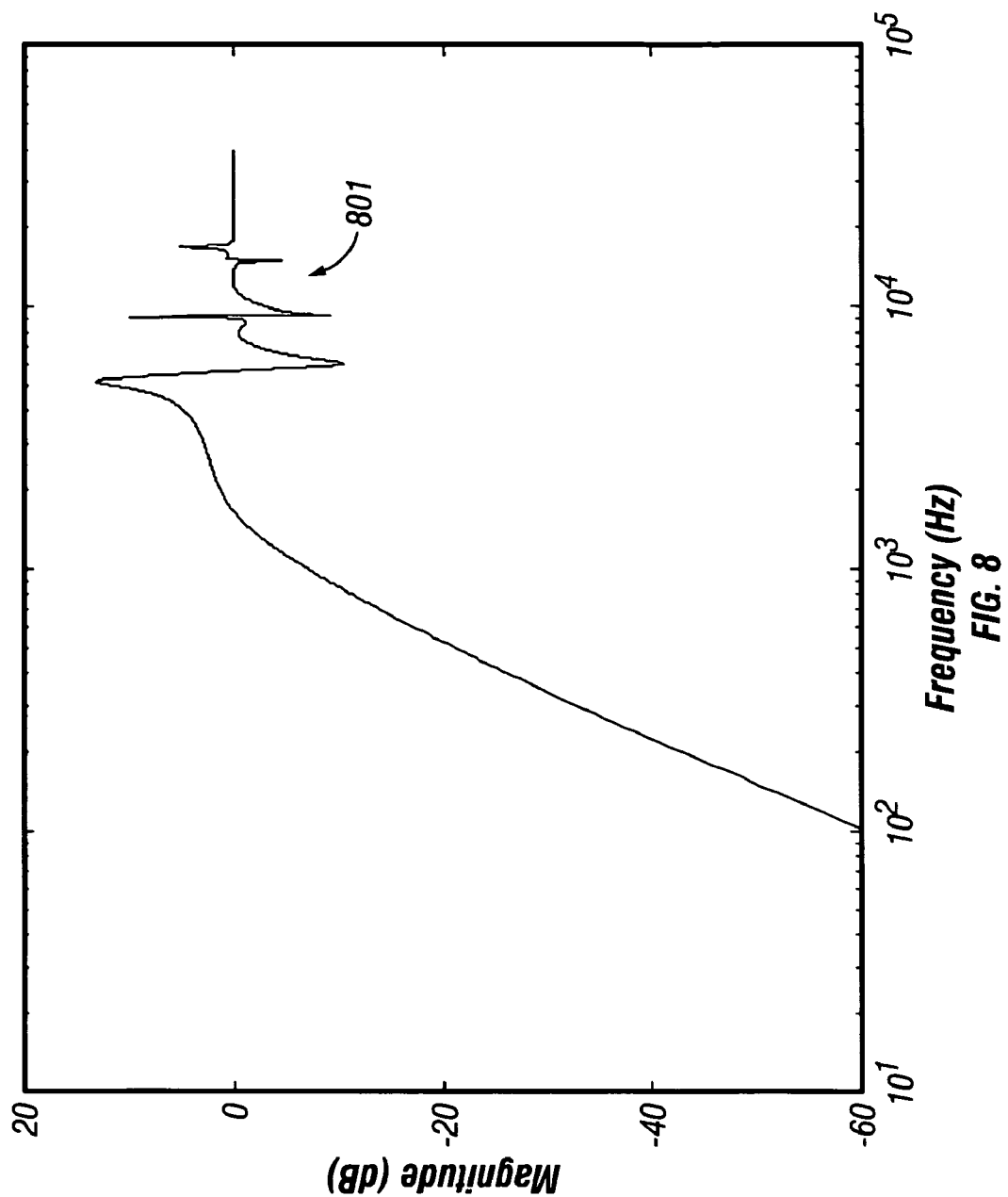
FIG. 8 shows a closed-loop magnitude response of the VCM error rejection as a function of frequency for the primary control loop portion of the control circuit, the primary amplifier and the VCM shown in FIG. 3.
Figure 9A:
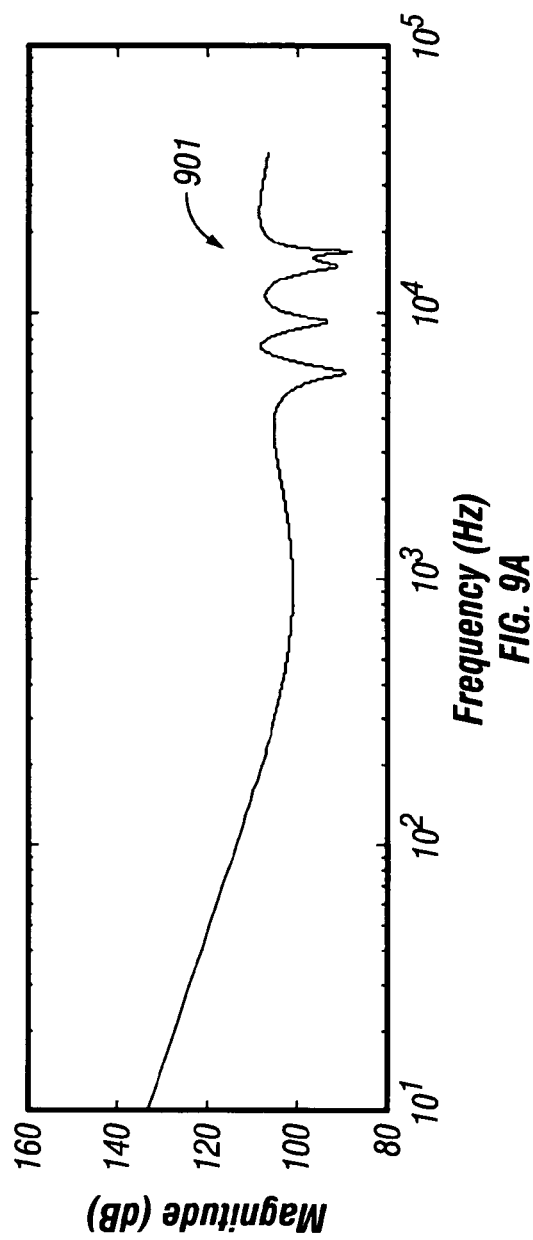
FIGS. 9A and 9B respectively show a magnitude and phase response as a function of frequency for the primary control portion of the control circuit shown in FIG. 3 when the control circuit includes notch filters.
Figure 9B:
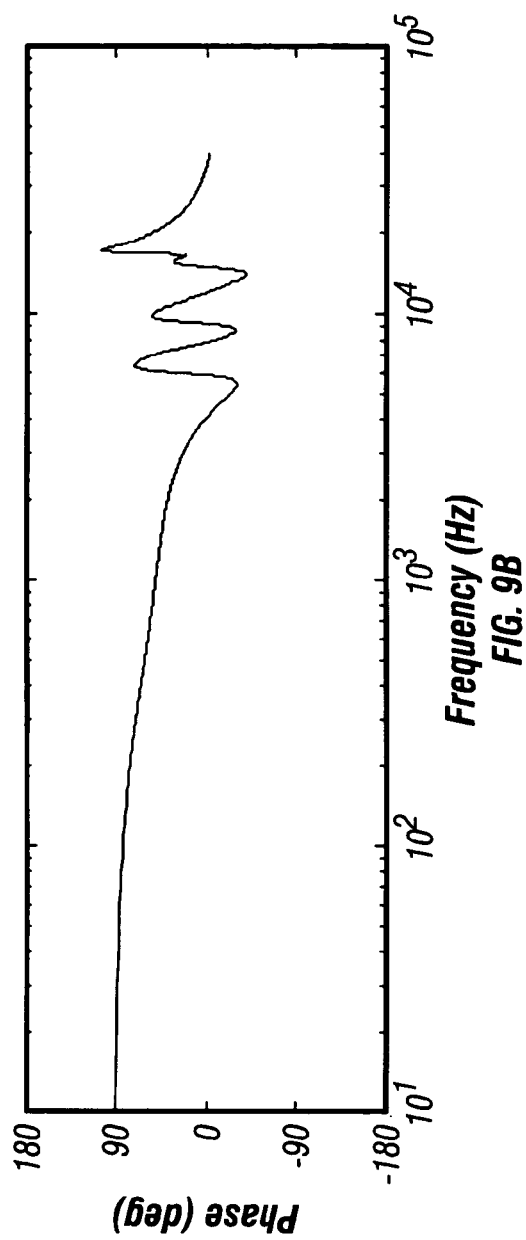
Figure 12:
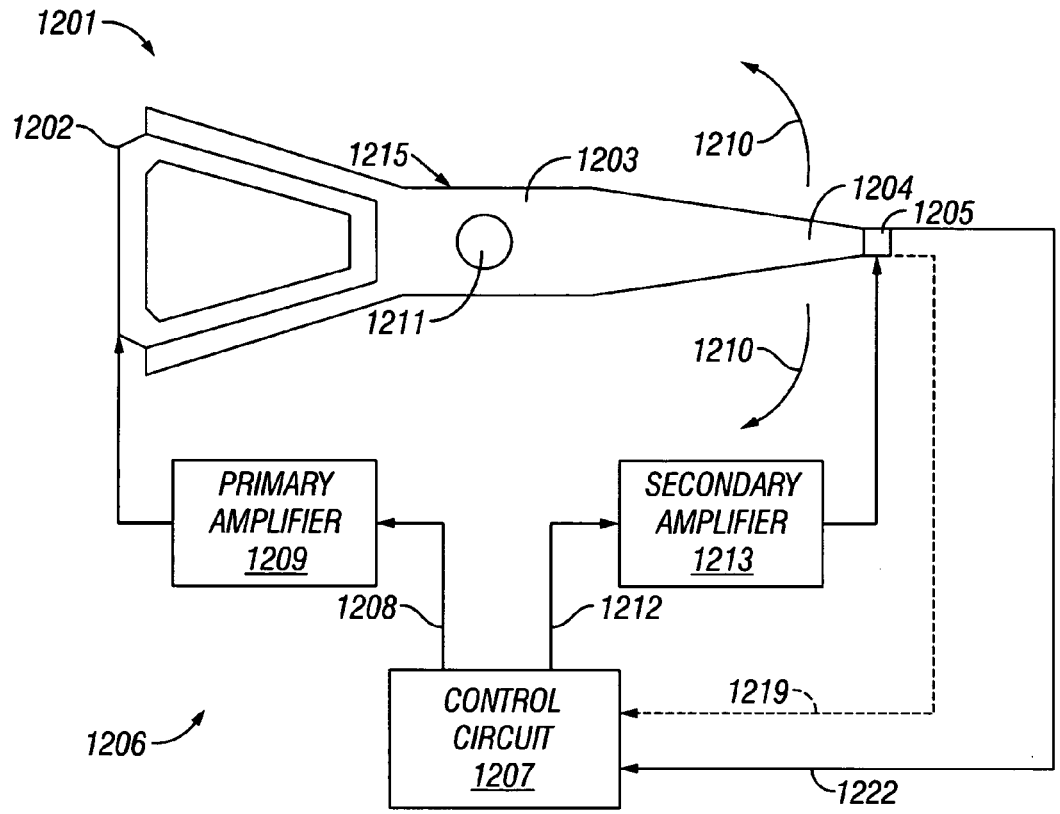
FIG. 12 is a schematic block diagram showing an exemplary actuator arm assembly and a simplified version of an exemplary control scheme according to the present invention.

FIG. 12 is a schematic block diagram showing an exemplary actuator arm assembly 1201 and a simplified version of an exemplary control scheme 1206 according to the present invention. Actuator arm assembly 1201 includes a primary actuator 1202, an actuator arm portion 1203, a read/write head suspension portion 1204, and a slider assembly 1205. Similar to the actuator arm assembly shown in FIG. 3, actuator arm assembly 1201 is controlled by an exemplary control scheme 1206 that includes a control circuit 1207 that generates a signal 1208 that is output to a primary amplifier 1209 that, in turn, drives primary actuator 1202 to affect the position of slider assembly 1205 in relation to data on a disk (not shown). External disturbances 1215, such as operational vibration and disk flutter, applied to actuator arm assembly 1201 also affect the position of slider assembly 1205 in relation to data on the disk. Primary actuator 1202 can be a rotary-type actuator or a linear-type actuator. Because rotary-type primary actuators are commonly used in HDDs, the following description of the present invention is directed toward rotary-type primary actuators. It should be understood, though, that the present invention is applicable to both rotary-type and linear-type primary actuators. When primary actuator 1202 is a rotary VCM, actuator arm assembly 1201 rotates (as indicated by arrows 1210) about a pivot 1211 under the force generated by primary actuator 1202. Control circuit 1207 also generates a signal 1212 that is output to a secondary amplifier 1213 that, in turn, drives a secondary actuator (not shown in FIG. 12).

Figure 13:
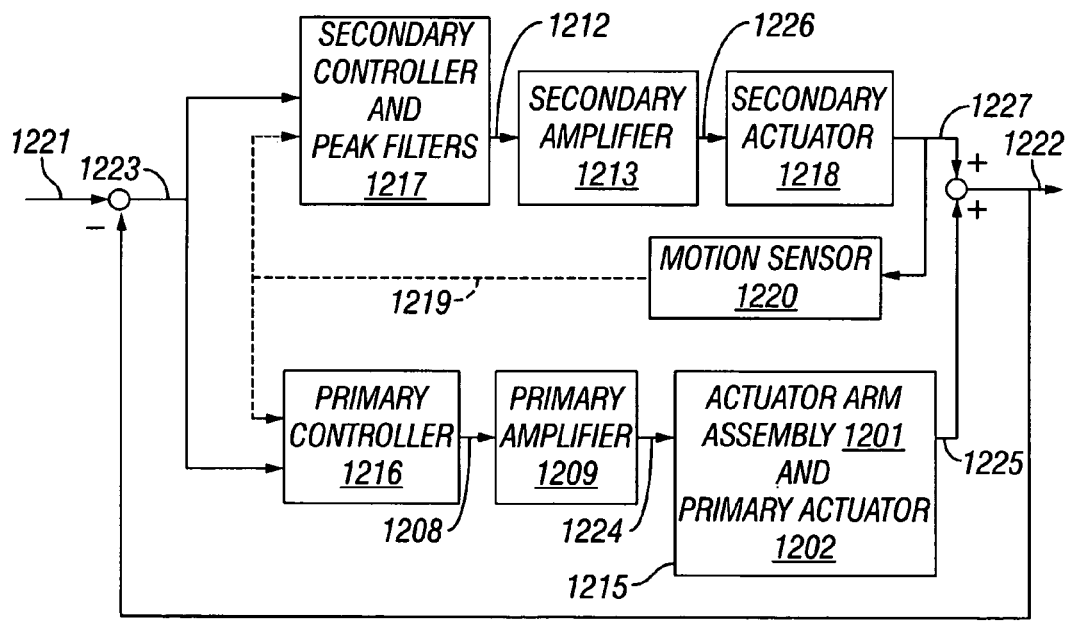
FIG. 13 shows a functional block diagram of the exemplary actuator arm assembly and the exemplary control scheme shown in FIG. 12 according to the present invention.

FIG. 13 shows a functional block diagram of exemplary actuator arm assembly 1201 and exemplary control system 1206 according to the present invention. As shown in FIG. 13, control system 1206 includes at least two closed loops. A primary control loop includes a primary controller 1216, primary amplifier 1209 and a primary actuator 1202, such as a VCM. A secondary control loop includes a secondary controller 1217, secondary amplifier 1213, and a secondary actuator 1218, such as a microactuator. Exemplary control system 1206 can potentially include two more closed control loops. For example, a secondary actuator motion signal 1219 that represents the motion of secondary actuator 1218 that is output from a motion sensor 1220 that may be included in slider assembly 1205 can be input to primary controller 1216 and/or secondary controller 1217. Alternatively, when a suspension-mounted PZT milliactuator is used, motion sensor 1220 would be mounted on read/write head suspension 1204. As yet another alternative, an estimated value of secondary actuator motion signal 1219 can be used. Such an estimated secondary actuator motion signal may be based on signals 1212, 1208 and 1222 and the models for primary actuator 1202, primary amplifier 1209, secondary actuator 1218, and secondary amplifier 1213.

A desired position signal 1221 of read/write heads (not shown) is compared to a signal 1222 representing the position of the read/write head to generate an error signal 1223. Error signal 1223 is input into primary controller 1216 and/or secondary controller 1217. Considering the primary control loop first, primary controller 1216 outputs signal 1208 in response to error signal 1223 (and in response to secondary actuator motion signal 1219 when motion sensor 1220 is used) that is input to primary amplifier 1209. Primary amplifier 1209 outputs a drive signal 1224 that drives VCM 1202. External disturbances 1215 are also applied to actuator arm assembly 1201 and VCM 1202. An actuator arm assembly position signal 1225 representing the position of actuator arm assembly 1201 is generated as part of the primary control loop. Secondary controller 1217 outputs signal 1212 in response to error signal 1223 (and in response to secondary actuator motion signal 1219 when motion sensor 1220 is used) that is input to secondary amplifier 1213. Secondary amplifier 1213 outputs a drive signal 1226 that drives secondary actuator 1218. Secondary actuator position signal 1227 represents the relative position of secondary actuator 1218 and may be measured, estimated, or unknown. Secondary actuator position signal 1227 combines with signal 1225 representing the position of actuator arm assembly 1201 to form measured position signal 1222.

The control bandwidth of secondary actuator 1218 is significantly higher than the control bandwidth of primary actuator 1202, in addition to being higher than many of the resonant frequencies of actuator arm assembly 1201. Peak filters at the resonant frequencies of the actuator arm assembly 1201 modes are generally stable when added to secondary actuator controller 1217 and do not suffer from the robustness issues that may occur if the peak filters were added to the primary actuator controller 1216. Adding peak filters to secondary actuator controller 1217 enables secondary actuator 1218 to compensate for motion caused by the resonant modes of actuator arm assembly 1201, regardless whether the resonant modes of actuator arm assembly are excited by the primary control loop or by external sources, such as air flow caused by disk motion and/or by spindle motion. The result is improved disturbance rejection and the ability to maintain the desired position of the read/write heads over the disk surface. According to the invention, the peak filters that included in the control loop for the secondary actuator can be embodied as active and/or passive components in the secondary actuator feedback loop and/or by digital signal processing (DSP) techniques.

The techniques of the present invention are applicable to rotary micro-electro-mechanical-system—(MEMS) type microactuators and other types of microactuators. Because rotary MEMS-type microactuators seem to have many advantages, the description of the present invention is directed toward rotary MEMS-type microactuators. It should be understood, though, that the techniques of the present invention are applicable to linear-type microactuators and to any type of secondary actuator that is located between the VCM and the read/write head, such as PZT-based secondary actuators and linear MEMS-type secondary actuators. There are at least two types of rotary MEMS microactuators for which the present invention is applicable. The first type is an undamped rotary MEMS microactuator. The second type is a damped (either actively and/or passively) MEMS rotary microactuator in which the first resonance has been damped (either actively and/or passively). An undamped rotary MEMS microactuator has a first mode at a relatively low frequency, typically between 2 kHz to 5 kHz. Above the first mode, there is a relatively wide frequency range, typically up to 80 kHz, in which there are no resonances. Both types of rotary MEMS microactuators will be described to illustrate the present invention.

Figure 14A:
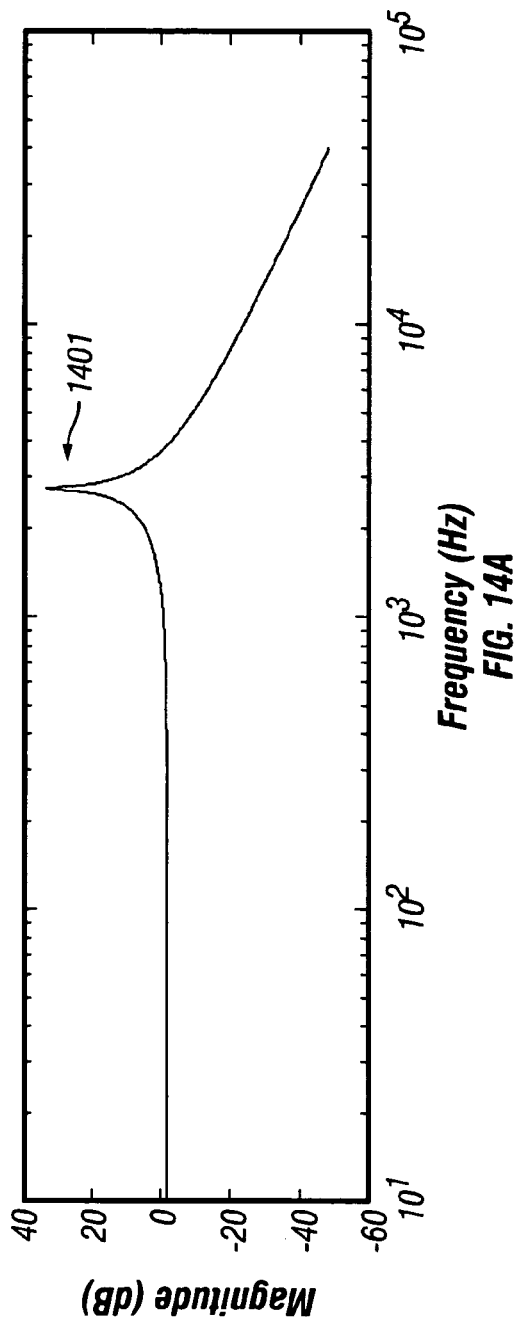
FIGS. 14A and 14B respectively show a magnitude and phase response as a function of frequency of a secondary amplifier and an undamped rotary MEMS microactuator.
Figure 14B:
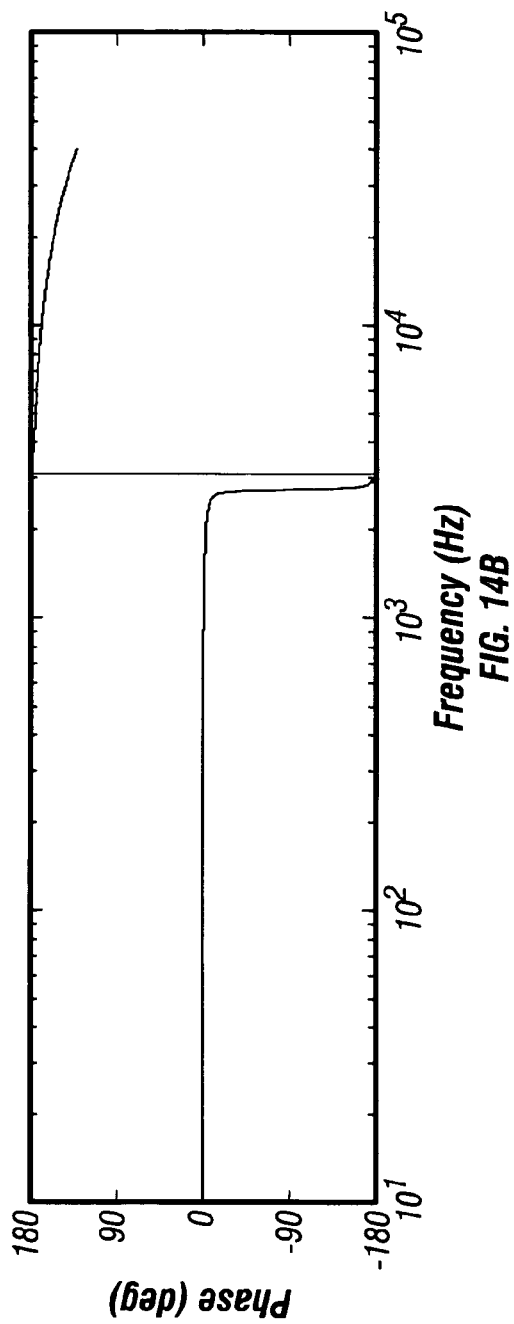
Figure 15A:
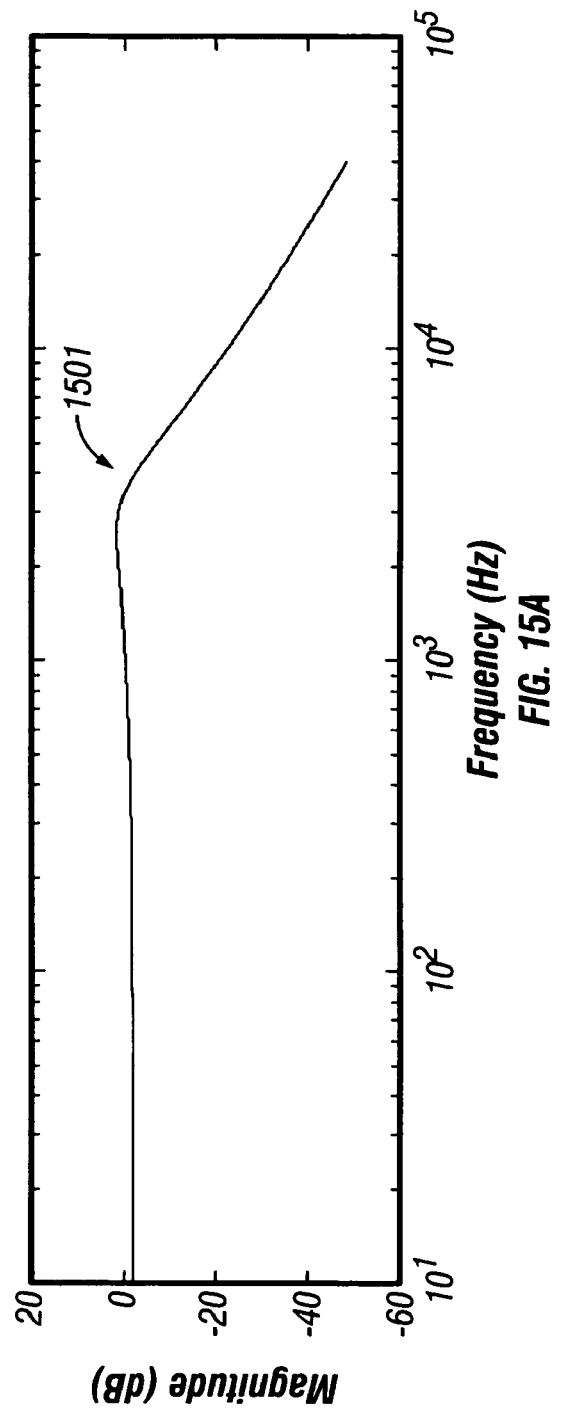
FIGS. 15A and 15B respectively show a magnitude and phase response as a function of frequency for a secondary amplifier and a damped rotary MEMS microactuator.
Figure 15B:
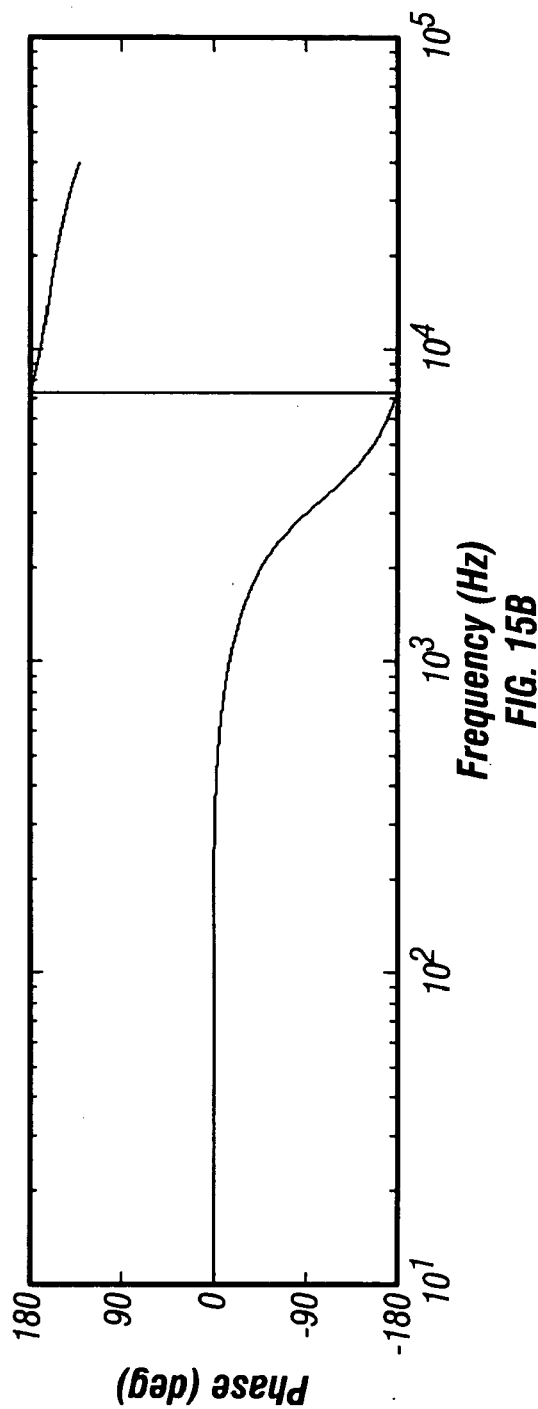

FIGS. 14A and 14B respectively show a magnitude and phase response as a function of frequency of secondary amplifier 1213 and an undamped rotary MEMS microactuator 1218. It should be understood that all of the graphs depicted herein are simulations that are based on data that is representative for the currently available generation of actuator arm assemblies for the enterprise class of hard disk drives. It should also be understood that graphs depicted herein could be based on data that is representative for other currently available classes of hard disk drives, such as desktop hard disk drives, mobile hard disk drives and consumer electronics hard disk drives. Moreover, it should also be understood that graphs depicted herein could be based on data that is representative for future classes of hard disk drives, such as desktop hard disk drives, mobile hard disk drives and consumer electronics hard disk drives. In FIG. 14A, the first resonance mode of undamped microactuator 1218 is indicated at 1401. There are no additional resonance modes until very high frequencies that are beyond the range of the graphs shown in FIGS. 14A and 14B. FIGS. 15A and 15B respectively show a magnitude and phase response as a function of frequency for secondary amplifier 1213 and a damped rotary MEMS microactuator 1218. The first resonance mode of the microactuator has been damped, as indicated at 1501.

Figure 16A:
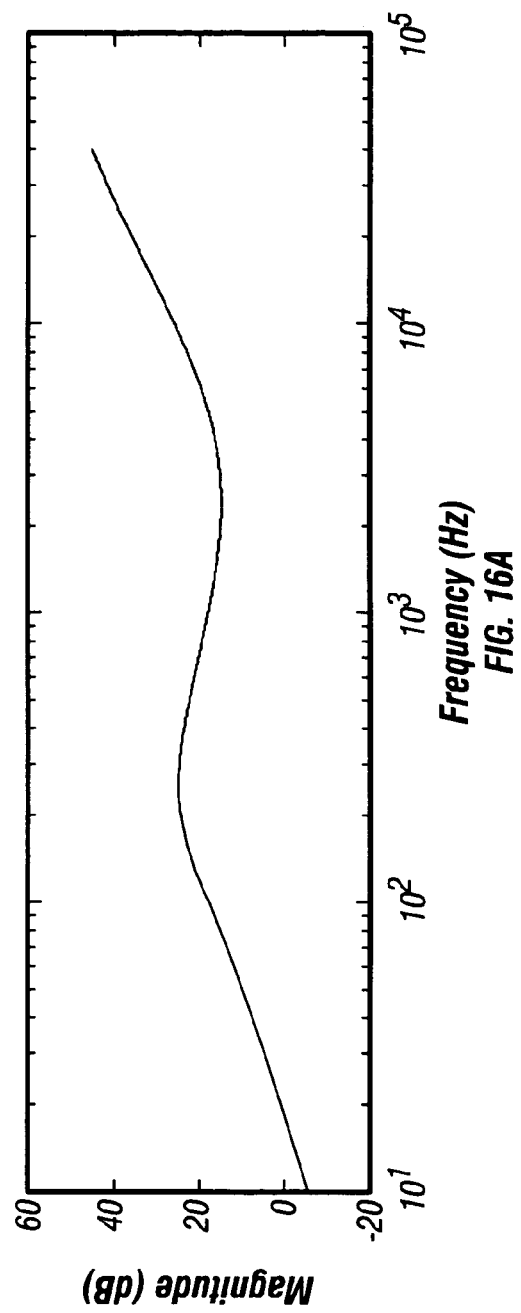
FIGS. 16A and 16B respectively show a magnitude and phase response as a function of frequency of a secondary microactuator controller.
Figure 16B:
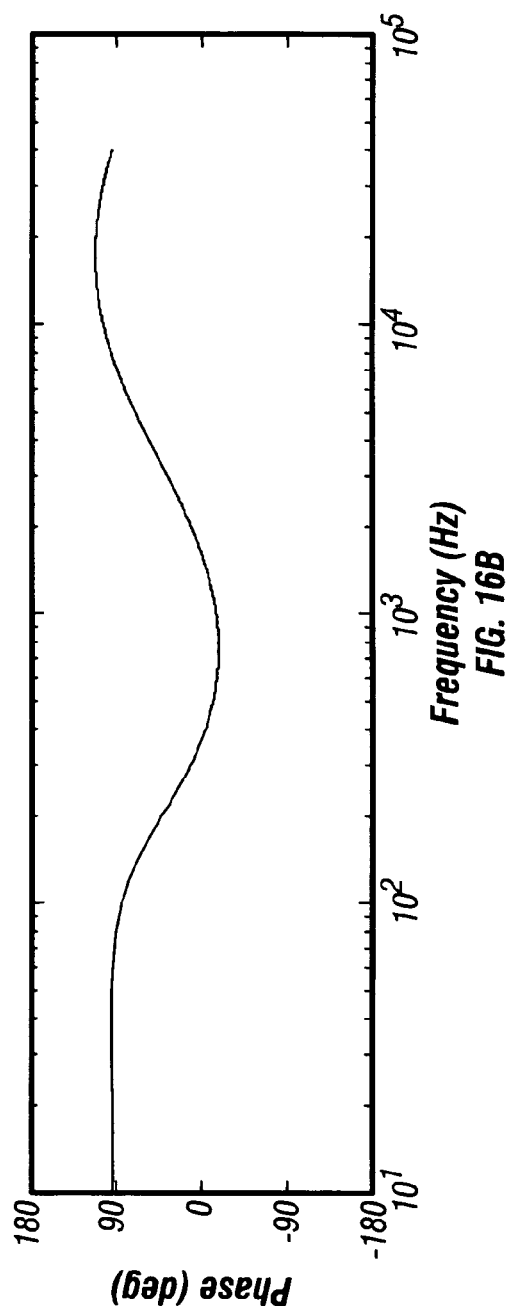

FIGS. 16A and 16B respectively show a magnitude and phase response as a function of frequency of secondary microactuator controller 1217 having no peak filters.

Figure 17A:
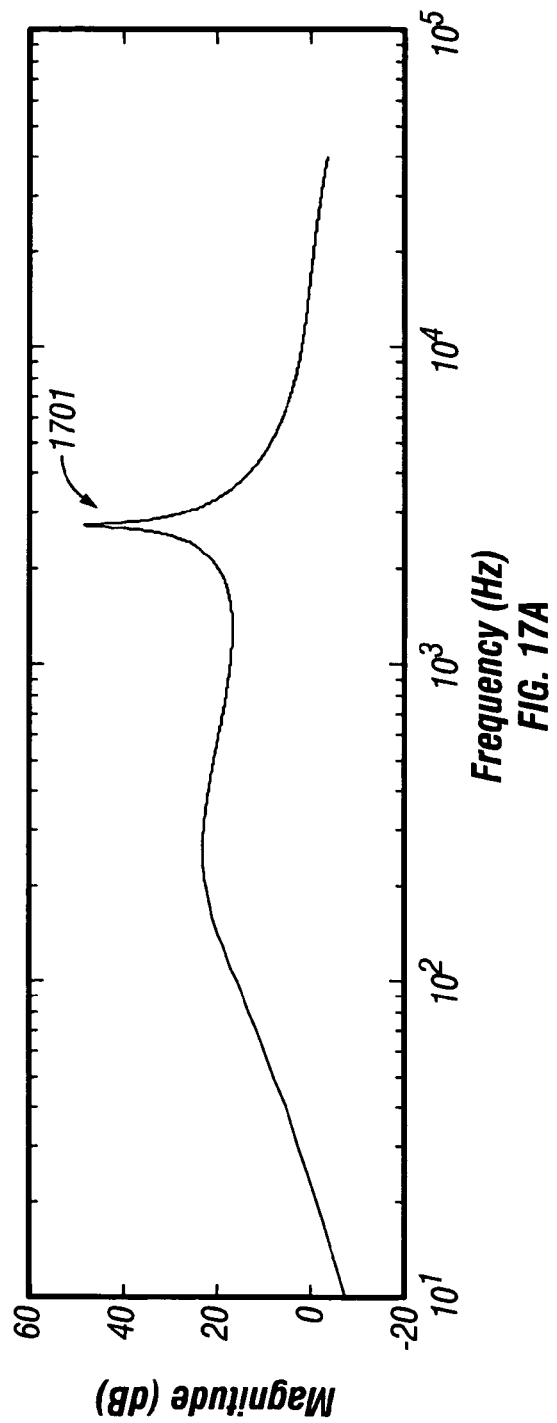
FIGS. 17A and 17B respectively show an open-loop magnitude and phase response as a function of frequency of a secondary microactuator controller having no peak filters, a secondary amplifier and an undamped rotary MEMS microactuator.
Figure 17B:
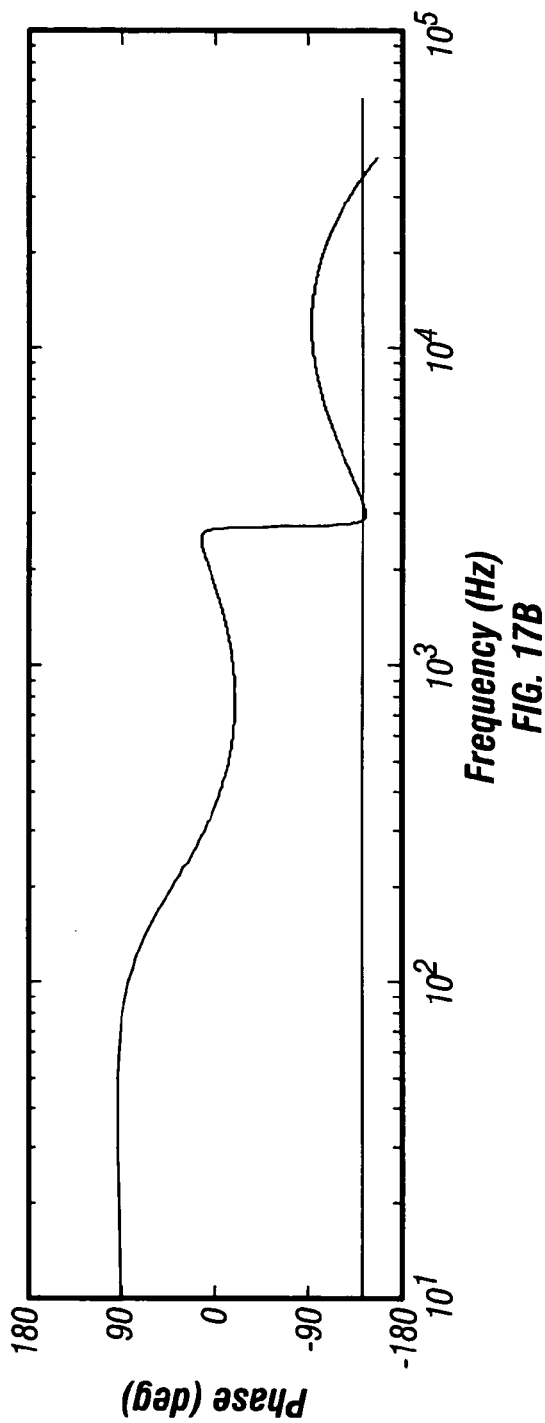

As a comparative baseline, FIGS. 17A and 17B respectively show an open-loop magnitude and phase response as a function of frequency of secondary microactuator controller 1217 having no peak filters, secondary amplifier 1213 and undamped rotary MEMS microactuator 1218. The first resonance peak of undamped MEMS microactuator 1218 is indicated at 1701.

FIGS. 18A and 18B respectively show a magnitude and phase response as a function of frequency of secondary controller 1217 having peak filters according to the present invention. The peak filters have frequencies corresponding to the frequencies of the higher-frequency primary actuator/arm modes, indicated as 502 in FIG. 5A. The effect on the magnitude response of secondary controller 1217 caused by the peak filters can be observed at 1801.

In contrast to FIGS. 17A and 17B, FIGS. 19A and 19B respectively show an open-loop magnitude and phase response as a function of frequency of secondary microactuator controller 1217 having peak filters according to the present invention, secondary amplifier 1213 and an undamped rotary MEMS microactuator 1218. The undamped resonance is indicated at 1901. The increased open-loop gain at the higher frequency actuator/arm modes caused by the peak filters is indicated at 1902.

Figure 20A:
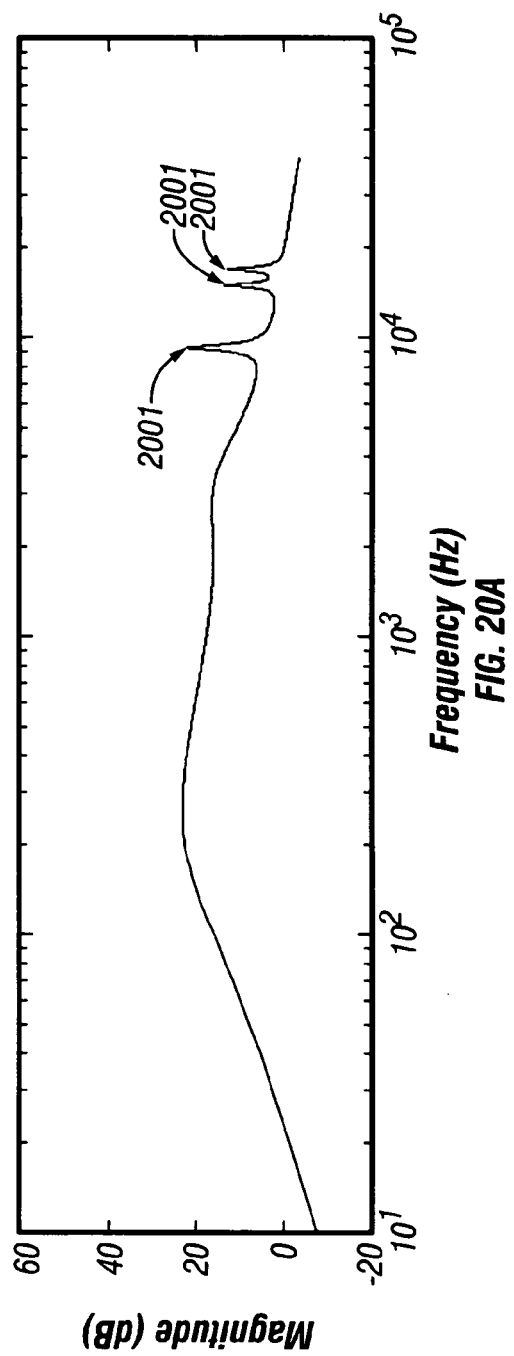
FIGS. 20A and 20B respectively show an open-loop magnitude and phase response as a function of frequency of a secondary controller having peak filters according to the present invention, a secondary amplifier and a damped rotary MEMS microactuator.
Figure 20B:
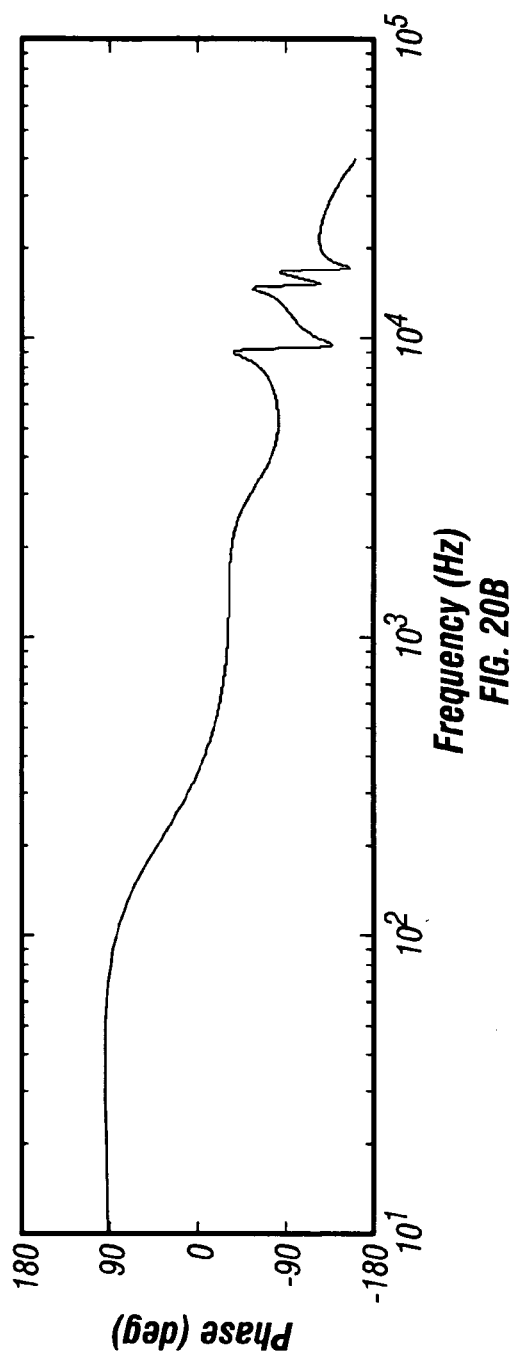

FIGS. 20A and 20B respectively show an open-loop magnitude and phase response as a function of frequency of secondary controller 1217 having peak filters according to the present invention, secondary amplifier 1213 and a damped rotary MEMS microactuator 1218. No resonance is visible in the response because the microactuator has been damped. The increased open-loop gain at the higher frequency actuator/arm modes caused by the peak filters is indicated at 2001.

As another comparative base line, FIGS. 21A and 21B respectively show open-loop magnitude and phase responses as functions of frequency for primary controller 1216, primary amplifier 1209, and VCM 1202 and for secondary controller 1217 having no peak filters, secondary amplifier 1213 and an undamped rotary MEMS microactuator 1218. Curve 2101 in FIG. 21A represents the open-loop magnitude response of primary controller 1216, primary amplifier 1209, and VCM 1202. Curve 2102 in FIG. 21B represents the open-loop phase response of primary controller 1216, primary amplifier 1209, and VCM 1202. Curve 2103 in FIG. 21A represents the open-loop magnitude response of secondary controller 1217 having no peak filters, secondary amplifier 1213 and an undamped rotary MEMS microactuator 1218. Curve 2104 in FIG. 21B represents the open-loop phase response of secondary controller 1217 having no peak filters, secondary amplifier 1213 and an undamped rotary MEMS microactuator 1218. Curve 2105 in FIG. 21A represents the combination of the open-loop magnitude response for primary controller 1216, primary amplifier 1209, and VCM 1202 and secondary controller 1217 having no peak filters, secondary amplifier 1213 and an undamped rotary MEMS microactuator 1218. Curve 2106 in FIG. 21B represents the combination of the open-loop phase response for primary controller 1216, primary amplifier 1209, and VCM 1202 and secondary controller 1217 having no peak filters, secondary amplifier 1213 and an undamped rotary MEMS microactuator 1218.

Figure 21C:
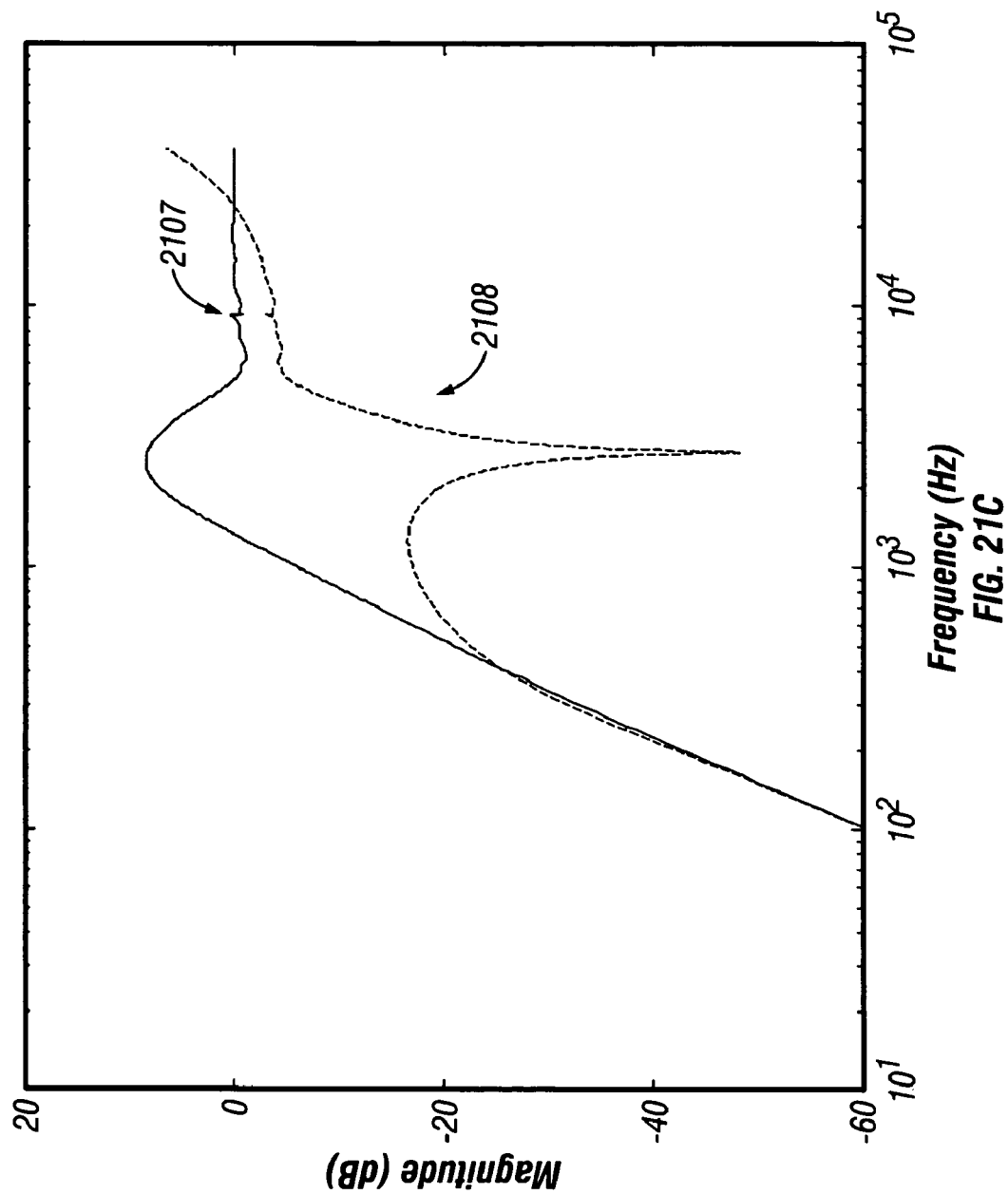
FIG. 21C shows magnitudes of the error rejection frequency responses for a primary control loop that includes a VCM and for a secondary controller having no peak filters, a secondary amplifier and an undamped rotary MEMS microactuator.

FIG. 21C shows a magnitude of the error rejection frequency response. Curve 2107 is the closed-loop error rejection response for the primary control loop that includes primary controller 1216, primary amplifier 1209, and VCM 1202. Curve 2108 is the closed-loop error rejection response for secondary controller 1217 having no peak filters, secondary amplifier 1213 and an undamped rotary MEMS microactuator 1218.

FIGS. 22A and 22B respectively show open-loop magnitude and phase responses as functions of frequency for primary controller 1216, primary amplifier 1209, and VCM 1202 and for secondary controller 1217 having peak filters according to the present invention, secondary amplifier 1213 and an undamped rotary MEMS microactuator 1218. Curve 2201 in FIG. 22A represents the open-loop magnitude response of primary controller 1216, primary amplifier 1209, and VCM 1202. Curve 2202 in FIG. 22B represents the open-loop phase response of primary controller 1216, primary amplifier 1209, and VCM 1202. Curve 2203 in FIG. 22A represents the open-loop magnitude response for secondary controller 1217 having peak filters according to the present invention, secondary amplifier 1213 and an undamped rotary MEMS microactuator 1218. Curve 2204 in FIG. 22B represents the open-loop phase response for secondary controller 1217 having peak filters according to the present invention, secondary amplifier 1213 and an undamped rotary MEMS microactuator 1218. The effect of the peak filters on the magnitude response can be seen at 2207. Curve 2205 in FIG. 22A represents the combination of the open-loop magnitude response for primary controller 1216, primary amplifier 1209, and VCM 1202 and secondary controller 1217 having peak filters according to the present invention, secondary amplifier 1213 and an undamped rotary MEMS microactuator 1218. Curve 2206 in FIG. 22B represents the combination of the open-loop phase response for primary controller 1216, primary amplifier 1209, and VCM 1202 and secondary controller 1217 having peak filters according to the present invention, secondary amplifier 1213 and an undamped rotary MEMS microactuator 1218.

FIG. 22C shows the magnitude of the error rejection frequency response. Curve 2208 is the closed-loop error rejection response for the primary control loop that includes primary controller 1216, primary amplifier 1209, and VCM 1202. Curve 2209 is the closed-loop error rejection response for secondary controller 1217 having peak filters according to the present invention, secondary amplifier 1213 and an undamped rotary MEMS microactuator 1218.

FIGS. 23A and 23B respectively show open-loop magnitude and phase responses as functions of frequency for primary controller 1216, primary amplifier 1209, and VCM 1202 and for secondary controller 1217 having peak filters according to the present invention, secondary amplifier 1213 and a damped rotary MEMS microactuator 1218. Curve 2301 in FIG. 23A represents the open-loop magnitude response of primary controller 1216, primary amplifier 1209, and VCM 1202. Curve 2302 in FIG. 23B represents the phase response of primary controller 1216, primary amplifier 1209, and VCM 1202. Curve 2303 in FIG. 23A represents the magnitude response of secondary controller 1217 having peak filters according to the present invention, secondary amplifier 1213 and a damped rotary MEMS microactuator 1218. Curve 2304 in FIG. 23B represents the phase response of secondary controller 1217 having peak filters according to the present invention, secondary amplifier 1213 and a damped rotary MEMS microactuator 1218.

Figure 23C:
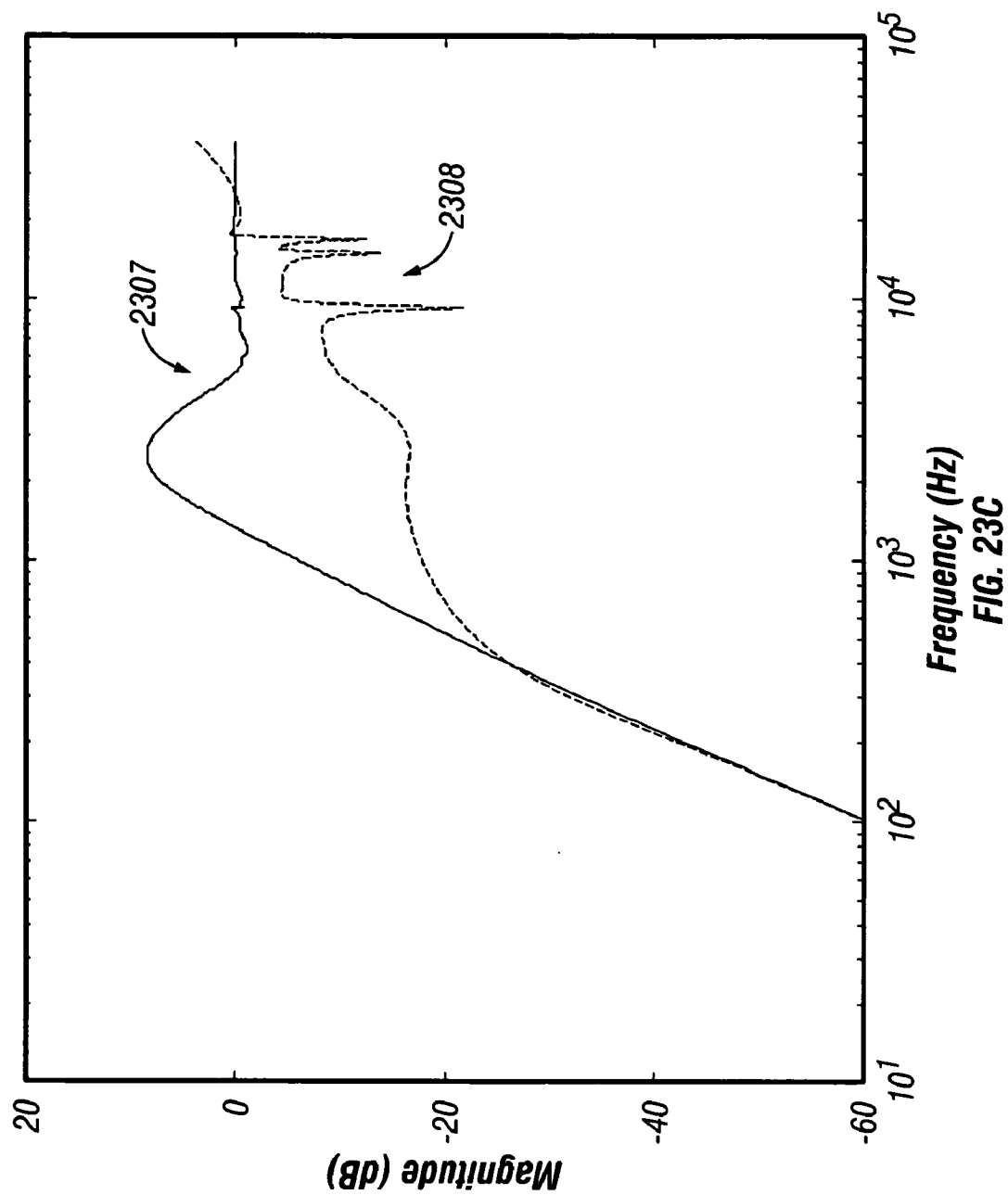
FIG. 23C shows a magnitude of the error rejection frequency response for a primary control loop that includes a VCM and for a secondary controller having peak filters according to the present invention, a secondary amplifier and a damped rotary MEMS microactuator.

FIG. 23C shows a magnitude of the error rejection frequency response. Curve 2307 is the closed-loop error rejection response for the primary control loop that includes primary controller 1216, primary amplifier 1209, and VCM 1202. Curve 2308 is the closed-loop error rejection response for secondary controller 1217 having peak filters according to the present invention, secondary amplifier 1213 and a damped rotary MEMS microactuator 1218.

FIG. 24A is a graph of NRRO as a function of frequency for exemplary actuator arm assembly 1201 in which secondary controller 1217 includes peak filters according to the present invention and secondary actuator 1218 is an undamped rotary MEMS microactuator. FIG. 24B is a graph of cumulative NRRO as a function of frequency corresponding to the graph of FIG. 24A. The abscissa for both FIGS. 24A and 24B is the frequency, and the ordinate of both FIGS. 24A and 24B is NRRO. The effect of the present invention is evident in the reduced amplitude of the NRRO caused by high-frequency actuator and arm (actuator/arm) mode effects of actuator arm assembly 1201 indicated at 2403 compared to the amplitudes indicated at 403 in FIG. 4A for actuator arm assembly 301.

FIG. 25A is a graph of NRRO as a function of frequency for exemplary actuator arm assembly 1201 in which secondary controller 1217 includes peak filters according to the present invention and secondary actuator 1218 is a damped rotary MEMS microactuator. FIG. 25B is a graph of cumulative NRRO as a function of frequency corresponding to the graph of FIG. 25A. The abscissa for both FIGS. 25A and 24B is the frequency, and the ordinate of both FIGS. 24A and 24B is NRRO. The effect of the present invention is evident in the reduced amplitude of the NRRO caused by high-frequency actuator and arm (actuator/arm) mode effects of actuator arm assembly 1201 indicated at 2503 compared to the amplitudes indicated at 403 in FIG. 4A for actuator arm assembly 301.

A variety of control loop configurations have been suggested for dual-stage servo systems. In particular, active-damping techniques for the main microactuator resonance, often using the relative position error signal (RPES) of a read/write head, have been suggested. The techniques of the present invention of adding peak filters to the control loop for the secondary actuator may be applied to any of the suggested control loop configurations regardless of whether the relative position error signal is used. In that regard, the present invention can utilize feedback control signals that are based on velocity and/or acceleration.

While the present invention has been described as providing peak filters as part of the secondary controller, such as secondary controller 1217 in FIG. 13, it should be understood that the peak filters can be located other than within the secondary controller. For example, when the secondary controller receives a secondary actuator motion signal, such as signal 1219, the secondary actuator motion signal can have been conditioned using peak filters before being input to the secondary controller. That is, the peak filters can be part of the transfer function for the feedback.

Further, while the present invention has been described in connection with NRRO, the present invention is applicable to repeatable runout (RRO).

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A control system for an actuator arm assembly for a hard disk drive, the actuator arm assembly including a primary actuator and a secondary actuator, the control system comprising:

a primary control loop controlling the primary actuator; and a secondary control loop controlling the secondary actuator, the secondary control loop including at least one peak filter at a frequency corresponding to at least one frequency that is greater in frequency than a primary mode of the actuator arm assembly.

2. The control system according to claim 1, wherein at least one peak filter has a frequency corresponding to a mode of the actuator arm assembly.

3. The control system according to claim 1, wherein at least one peak filter has a frequency corresponding to a frequency of a disturbance that is external to the actuator arm assembly and that affects a position of the actuator arm assembly.

4. The control system according to claim 1, wherein at least one peak filter has a frequency corresponding to a frequency of an airflow disturbance that is external to the actuator arm assembly and that affects a position of the actuator arm assembly.

5. The control system according to claim 1, wherein at least one peak filter has a frequency corresponding to off-track motion induced by the primary actuator.

6. The control system according to claim 1, wherein at least one peak filter has a frequency corresponding to a frequency of a disturbance that causes non-repeatable runout.

7. The control system according to claim 1, wherein at least one peak filter has a frequency corresponding to a frequency of a disturbance that causes repeatable runout.

8. The control system according to claim 1, wherein the secondary control loop includes a controller portion and a feedback portion, and
wherein at least one peak filter is included in the controller portion of the secondary control loop.

9. The control system according to claim 1, wherein the secondary control loop includes a controller portion and a feedback portion, and
wherein at least one peak filter is included in the feedback portion of the secondary control loop.

10. The control system according to claim 1, wherein the secondary actuator is a micro-electro-mechanical-system (MEMS) microactuator.

11. The control system according to claim 10, wherein the secondary actuator is an undamped rotary-type MEMS microactuator.

12. The control system according to claim 10, wherein the secondary actuator is a damped rotary-type MEMS microactuator.

13. The control system according to claim 10, wherein the secondary actuator is an undamped linear-type MEMS microactuator.

14. The control system according to claim 10, wherein the secondary actuator is a damped linear-type MEMS microactuator.

15. The control system according to claim 1, wherein the secondary actuator is a linear-type secondary actuator.

16. The control system according to claim 1, wherein the secondary actuator is a PZT-based secondary actuator.

17. The control system according to claim 1, wherein the primary actuator is a rotary-type primary actuator.

18. The control system according to claim 1, wherein the primary actuator is a linear-type primary actuator.

19. The control system according to claim 1, wherein the primary control loop controls the primary actuator based on a relative motion of the secondary actuator.

20. The control system according to claim 19, wherein the relative motion of the secondary actuator is measured.

21. The control system according to claim 19, wherein the relative motion of the secondary actuator is estimated.

22. The control system according to claim 1, wherein the secondary control loop controls the secondary actuator based on a relative motion of the secondary actuator.

23. The control system according to claim 22, wherein the relative motion of the secondary actuator is measured.

24. The control system according to claim 22, wherein the relative motion of the secondary actuator is estimated.

25. A hard disk drive, comprising:
an actuator arm assembly including a primary actuator and a secondary actuator; and
a control system having a primary control loop controlling the primary actuator and a secondary control loop controlling the secondary actuator, the secondary control loop including at least one peak filter at a frequency corresponding to at least one frequency that is greater in frequency than a primary mode of the actuator arm assembly.

26. The hard disk drive according to claim 25, wherein at least one peak filter has a frequency corresponding to a mode of the actuator arm assembly.

27. The hard disk drive according to claim 25, wherein at least one peak filter has a frequency corresponding to a frequency of a disturbance that is external to the actuator arm assembly and that affects a position of the actuator arm assembly.

28. The hard disk drive according to claim 25, wherein at least one peak filter has a frequency corresponding to a frequency of an airflow disturbance that is external to the actuator arm assembly and that affects a position of the actuator arm assembly.

29. The hard disk drive according to claim 25, wherein at least one peak filter has a frequency corresponding to off-track motion induced by the primary actuator.

30. The hard disk drive according to claim 25, wherein at least one peak filter has a frequency corresponding to a frequency of a disturbance that causes non-repeatable runout.

31. The hard disk drive according to claim 25, wherein at least one peak filter has a frequency corresponding to a frequency of a disturbance that causes repeatable runout.

32. The hard disk drive according to claim 25, wherein the secondary control loop includes a controller portion and a feedback portion, and
wherein at least one peak filter is included in the controller portion of the secondary control loop.

33. The hard disk drive according to claim 25, wherein the secondary control loop includes a controller portion and a feedback portion, and
wherein at least one peak filter is included in the feedback portion of the secondary control loop.

34. The hard disk drive according to claim 25, wherein the secondary actuator is a micro-electro-mechanical-system (MEMS) microactuator.

35. The hard disk drive according to claim 34, wherein the secondary actuator is an undamped rotary-type MEMS microactuator.

36. The hard disk drive according to claim 34, wherein the secondary actuator is a damped rotary-type MEMS microactuator.

37. The hard disk drive according to claim 34, wherein the secondary actuator is an undamped linear-type MEMS microactuator.

38. The hard disk drive according to claim 34, wherein the secondary actuator is a damped linear-type MEMS microactuator.

39. The hard disk drive according to claim 25, wherein the secondary actuator is a linear-type secondary actuator.

40. The hard disk drive according to claim 25, wherein the secondary actuator is a PZT-based secondary actuator.

41. The hard disk drive according to claim 25, wherein the primary actuator is a rotary-type primary actuator.

42. The hard disk drive according to claim 25, wherein the primary actuator is a linear-type primary actuator.

43. The hard disk drive according to claim 25, wherein the primary control loop controls the primary actuator based on a relative motion of the secondary actuator.

44. The hard disk drive according to claim 43, wherein the relative motion of the secondary actuator is measured.

45. The hard disk drive according to claim 43, wherein the relative motion of the secondary actuator is estimated.

46. The hard disk drive according to claim 25, wherein the secondary control loop controls the secondary actuator based on a relative motion of the secondary actuator.

47. The hard disk drive according to claim 46, wherein the relative motion of the secondary actuator is measured.

48. The hard disk drive according to claim 46, wherein the relative motion of the secondary actuator is estimated.

* * * * *